United States Patent
Lee et al.

(10) Patent No.: US 6,622,141 B2
(45) Date of Patent: Sep. 16, 2003

(54) BULK LOADING METHOD FOR A HIGH-DIMENSIONAL INDEX STRUCTURE

(75) Inventors: Hun-Soon Lee, Taejon (KR); June Kim, Taejon (KR); Jae-Soo Yoo, Chungcheongbuk-do (KR); Seok-Il Song, Chungcheongbuk-do (KR); June-Il Pee, Chungcheongbuk-do (KR)

(73) Assignee: Electronics and Telecommunications Research Institute (KR)

( * ) Notice: Subject to any disclaimer, the term of this patent is extended or adjusted under 35 U.S.C. 154(b) by 146 days.

(21) Appl. No.: 09/865,362

(22) Filed: May 25, 2001

(65) Prior Publication Data

US 2002/0095412 A1 Jul. 18, 2002

(30) Foreign Application Priority Data

Dec. 5, 2000 (KR) ......................................... 2000-73539

(51) Int. Cl.$^7$ ............................................... G06F 17/30
(52) U.S. Cl. ............................................... 707/5; 707/4
(58) Field of Search ............................... 707/1, 2, 3, 4, 707/5, 8, 100, 101

(56) References Cited

U.S. PATENT DOCUMENTS

| | | |
|---|---|---|
| 5,781,906 A | 7/1998 | Aggarwal et al. .......... 707/102 |
| 6,154,746 A * | 11/2000 | Berchtold et al. .......... 707/100 |
| 6,263,334 B1 * | 7/2001 | Fayyad et al. .......... 707/5 |
| 6,408,300 B1 * | 6/2002 | Bergman et al. .......... 707/101 |

OTHER PUBLICATIONS

Efficient Bulk Loading of Large High–Dimensional Indexes, 10 pages.
A Generic Approach to Bulk Loading Multidimensional Index Structures, 14 pages.
A Greedy Algorithm for Bulk Loading R–trees, 19 pages.

* cited by examiner

*Primary Examiner*—Diane D. Mizrahi
*Assistant Examiner*—Yicun Wu
(74) *Attorney, Agent, or Firm*—Blakely, Sokoloff, Taylor & Zafman

(57) ABSTRACT

A bulk loading method, for use in a high-dimensional index structure using some parts of dimensions based on an unbalanced binarization scheme, accelerates an index construction and improves a search performance. For the purpose, the bulk loading method calculates a topology of the index by recognizing information for the index to be constructed using a given data set, splits the given data set into sub-sets of data by repeatedly performing an establishment of a split strategy and a binarization based on the calculated topology of the index, if a leaf node is derived from the sub-sets of data divided through a top-down recursive split process, reflects a minimum bounding region of the leaf node on a higher node, and, if a non-leaf node is generated, repeatedly performing the above processes for another sub-set of data to thereby produce a final root node.

21 Claims, 24 Drawing Sheets

SPLIT INTERVAL

PIVOT VALUE      SPLIT INTERVAL

POSITION OF PIVOT VALUE

DATA HAVING AN IDENTICAL
VALUE WITH A PIVOT VALUE

DATA HAVING AN IDENTICAL
VALUE WITH A PIVOT VALUE

DATA HAVING AN IDENTICAL
VALUE WITH A PIVOT VALUE

DATA HAVING AN IDENTICAL
VALUE WITH A PIVOT VALUE

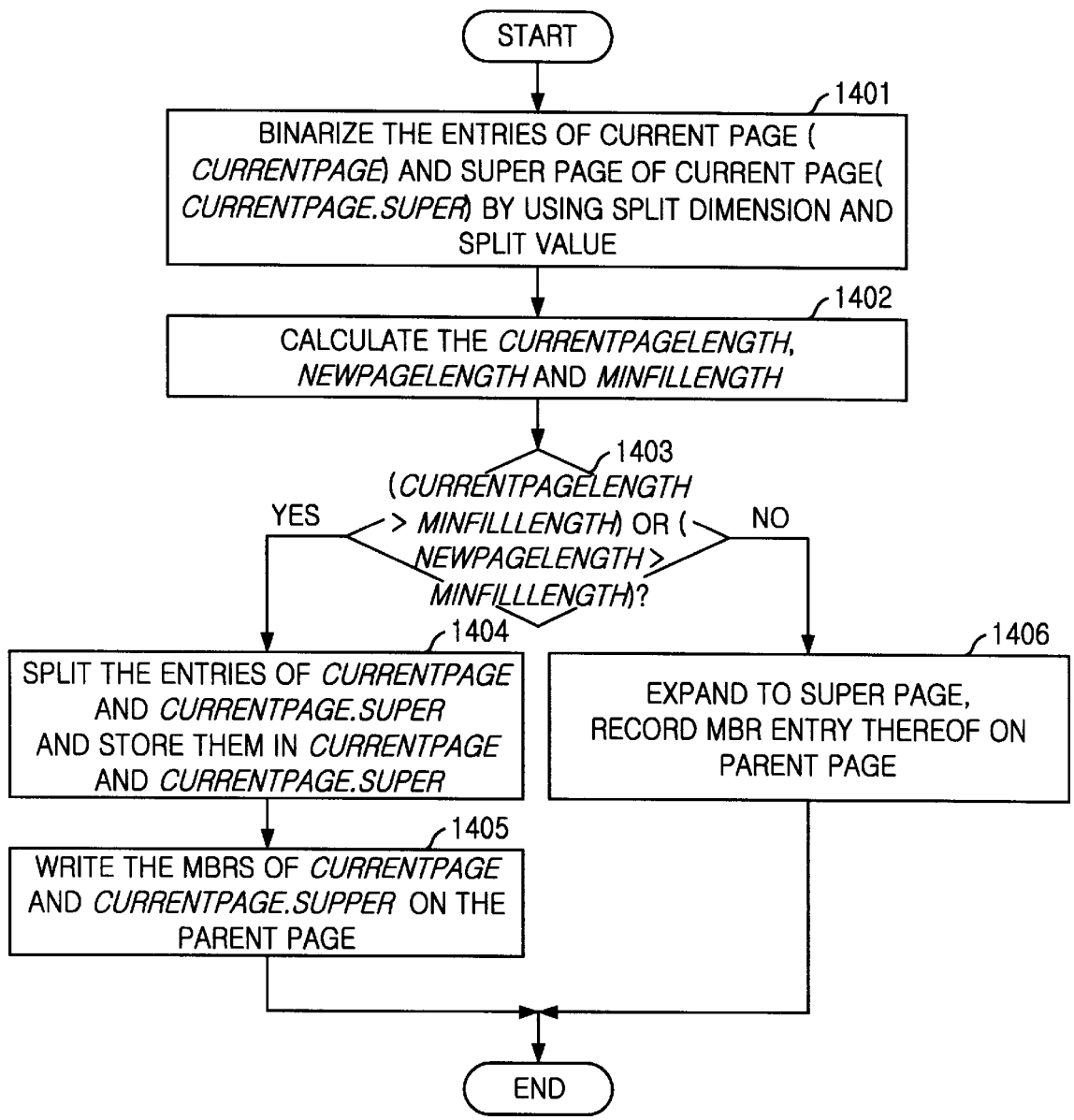

BULK LOADING METHOD FOR A HIGH-DIMENSIONAL INDEX STRUCTURE

FIELD OF THE INVENTION

The present invention relates to a bulk loading method for use in a high-dimensional index structure; and, more particularly, to a bulk loading method of using some parts of dimensions to thereby accelerate an index construction and improve a search performance, and a computer readable recording medium in which a program implementing the method is recorded.

PRIOR ART OF THE INVENTION

In general, a bulk loading method is a computational method which constructs an index by inserting a substantial amount of static high-dimensional data at one time instead of inserting one-by-one data, thereby reducing an index construction time and improving a search performance.

Conventional bulk loading algorithms are classified according to whether or not employing a sort and further divided into a bottom-up and a top-down fashion.

First of all, as methods for performing the sort, there are following methods such as NX[Roussopoulos, "Direct Spatial Search On Pictorial Databases Using Packed R-Trees", Proc. ACM SIGMOD, 1985], HS[Kamel, "On Packing R-Trees", Proc. 2nd International Conference on Information and Knowledge Management, 1993], STR[Scott T. Leutenegger, "STR: A Simple and Efficient Algorithm for R-Tree Packing", Proc. 13th ICDE, 1997], TGS[Yvan J. Garcia, "A Greedy Algorithm for Bulk Loading R-Trees", University of Denver Computer Science Tech., 1997], BnC [Aggarwal et al., System and Method for Construction of a Data Structure for Indexing Multidimensional Objects, U.S. Pat. No. 5,781,906], and the like.

Among them, algorithms performing the index construction using the bottom-up fashion will be first explained.

It is easy to implement an NX algorithm that constructs an index after executing a sort only for an X-axis and this algorithm has a good search performance for a point query. However, since Y-axis values are neglected and thus perimeters of parent nodes become larger, there occurs a defect to deteriorate a performance for a region query.

Therefore, HS has introduced an algorithm using a storage sequence determined by a Hilbert curve. Since the Hilbert algorithm reduces a perimeter of an entire region as managing a size of the entire region as small, it can substantially advance a performance for a region query compared with the NX algorithm.

Meanwhile, it is easily implemented a STR(Sort-Tile-Recursive) algorithm clustering the rectangles in order to minimize the number of visiting nodes during the execution of query processing and this algorithm can obtain a substantially enhanced performance compared with conventional algorithms.

However, sometimes the Hilbert algorithm can accomplish a better performance for VLSI data compared with the STR algorithm. Therefore, it can be said that the performances of the Hilbert algorithm and the STR algorithm depend on the type of given data. The above NX, HS and STR algorithms construct the index in the bottom-up fashion by using a fixed pre-processing.

On the other hand, TGS has proposed a Top-down Greedy Split (TGS) algorithm constructing a tree in the top-down fashion. The TGS algorithm uses a pre-processing for rearranging the data contained in a database and can construct a tree requiring fewer disk accesses than trees made by conventional methods. However, since a multiple rearrangement should be considered, there is a drawback in which a longer time is required to construct a tree.

In order to prevent a search performance from being deteriorated by an increase of an MBR (Minimum Bounding Region) and an overlapped region of an algorithm such as the HS algorithm using a linear ordering method, a newly proposed BnC method constructs an index tree by using two stages, i.e., binarization and compression. However, this method consumes a longer construction time because of using a large amount of sort for split dimensions in the binarization stage.

Then, as bulk loading algorithms not performing the sort, there are BFT [Van Den Bercken, "A General Approach to Bulk Loading Multidimensional Index Structures", 23rd Conf. VLDB, 1997] and UBBT[Christian Böhm, "Efficient Bulk Loading of Large High-Dimensional Indexes", Int. Conf. on Data Warehousing and Knowledge Discovery Dawak, 1999]. The bulk loading algorithm of BFT constructs an effective index structure by using a split or merging scheme instead of a data sort scheme. Specially, this algorithm can reduce an index construction time by using a buffer tree including a buffer on an index node.

The UBBT is a method composed of the bottom-up fashion without performing the sort. This method has characteristics of using a binarization method when dividing a data set instead of the sort and applying an unbalanced split method for the binarization. The conventional algorithms except for the UBBT have a disadvantage of improving a performance only for one of an index construction time and a search time.

That is, although the methods employing the sort improve the search performance, it increases an index construction time by computations required for performing the sort. On the other hand, the methods not performing the sort can reduce the index construction time since it does not perform the sort, whereas it deteriorates the search performance.

SUMMARY OF THE INVENTION

It is, therefore, an object of the present invention to provide a bulk loading method, for use in a high-dimensional index structure using some parts of dimensions based on an unbalanced binarization scheme, for reducing the index construction time and improving the search performance, and a computer readable recording medium in which a program implementing the method is recorded.

In accordance with one aspect of the present invention, there is provided a bulk loading method employed in a high-dimensional index structure for constructing an index, which comprises the steps of: (a) calculating the topology of the index by recognizing the information for the index to be constructed with a given data set; (b) splitting the given data set into sub-sets of data by repeatedly performing an establishment of a split strategy and a binarization based on the calculated topology of the index; (c) if a leaf node is derived from the sub-sets of data divided through a top-down recursive split process, reflecting a MBR of the leaf node on a higher node; and (d) if a non-leaf node is generated, repeatedly performing the steps (a) to (c) for another sub-set of data to thereby produce a final root node.

In accordance with another aspect of the present invention, there is provided a computer program product for use in an indexing unit including a process, comprising: a computer readable medium; a first program instruction code for calculating the topology of the index by recognizing the information for the index to be constructed with a given data set; a second program instruction code for splitting the given data set into sub-sets of data by repeatedly performing an establishment of a split strategy and a binarization based on the calculated topology of the index; a third program instruction code for, if a leaf node is derived from the sub-sets of data divided through a top-down recursive split process, reflecting a MBR of the leaf node on a higher node; and a fourth program instruction code for, if a non-leaf node is generated, repeatedly executing the above processes performed by the first to third program instruction codes for another sub-set of data to thereby produce a final root node.

BRIEF DESCRIPTION OF THE DRAWINGS

The objects and features of the present invention will become apparent from the following description of preferred embodiments given in conjunction with the accompanying drawings, in which:

FIG. 15 shows a flow chart of a SplitInternalPage( ) function, called in the ConstructIndexPage( ) function, for dealing with the overflow of an internal page by splitting the internal page;

DETAILED DESCRIPTION OF THE PREFERRED EMBODIMENTS

Hereinafter, with reference to the drawings, some of the preferred embodiments of the present invention will be explained in detail.

Figure 1:
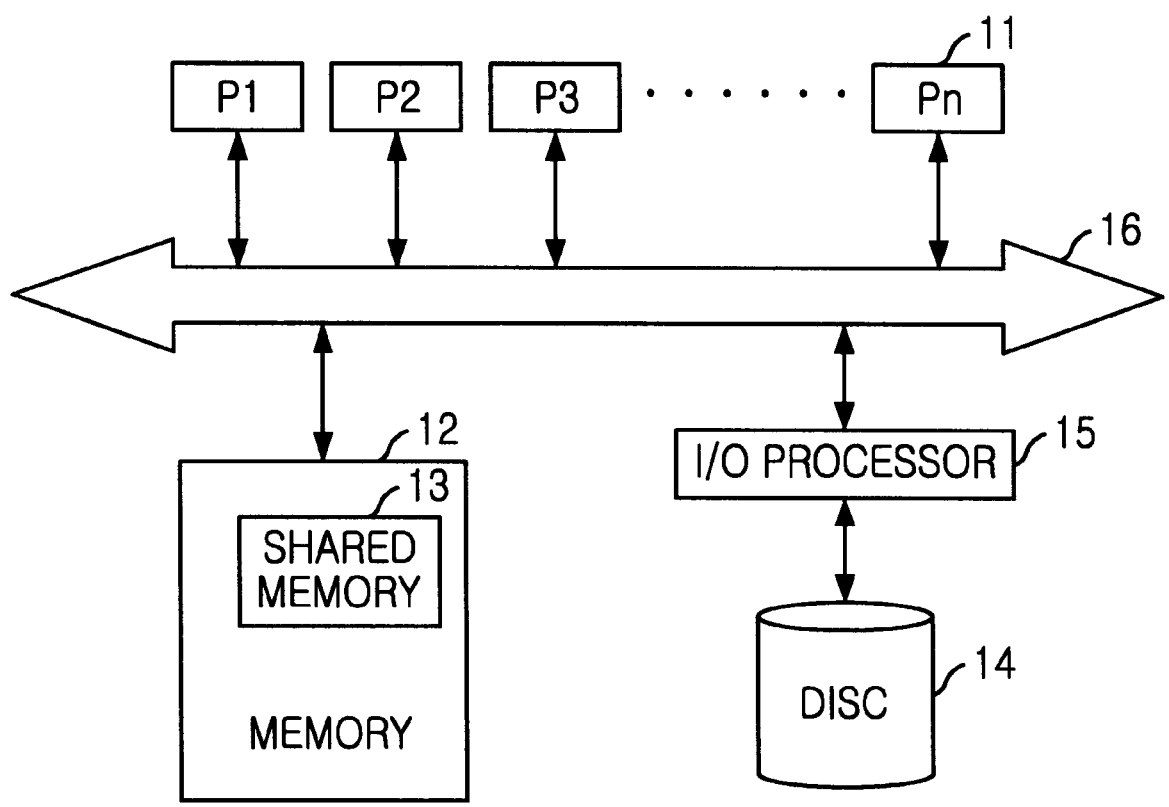
FIG. 1 shows a block diagram of hardware in accordance with the present invention.

Referring to FIG. 1, there is shown a block diagram of hardware in accordance with the present invention.

As described in FIG. 1, a memory 12, an input/output (I/O) processor 15 of a central processing unit(CPU) and single or multiple processors (P1, P2, . . . , Pn) 11 are connected through a system bus 16. The memory 12 of the CPU includes a shared memory 13 and the I/O processor 15 is connected to a disk 14 that is a secondary storage. That is, the present invention can operate in a general hardware environment employing the single processor or multiple processors and the shared memory region.

Figure 2:
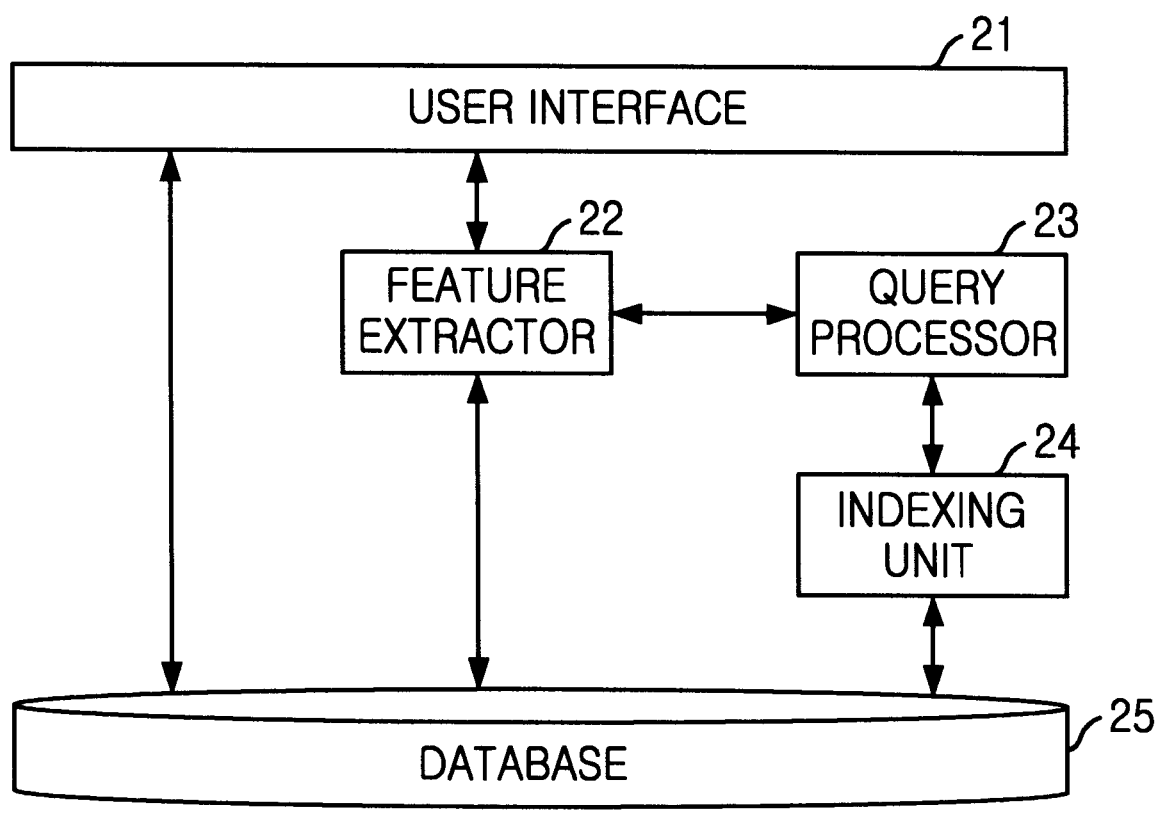
FIG. 2 depicts a block diagram of an image search system in accordance with an embodiment of the present invention.

In FIG. 2, there is illustrated a block diagram of an image search system in accordance with an embodiment of the present invention.

As shown in FIG. 2, the image search system comprises a user interface 21, a feature extractor 22, a query processor 23, an indexing unit 24 and a database 25.

The user interface 21 is a module for providing an interface to be used in constructing a high-dimensional index or retrieving an image for which a user wants to search.

The feature extractor 22 is a module for extracting the features representing an image when storing the image provided from the user interface 21 in the database or searching for the similar image.

The query processor 23 is a module for assigning requirements for an image to be searched from the user interface 21 into the indexing unit 24 and processing an index construction request of a user.

The indexing unit 24 is a module for constructing an index tree so as to provide a rapid approach to the features extracted by the feature extractor 22 and supplying operational functions for an index such as insertion, deletion and search.

The database 25 stores information for the image itself and the index tree produced by the indexing unit 24. Therefore, the user interface 21 reads the image directly from the database 25 after it gets the information about similar images to be retrieved using the indexing unit 25 and query processor 24. Herein, the present invention is related to an index construction that is one of the functions performed by the indexing unit 24.

Hereinafter, we will explain a bulk loading method in accordance with the present invention by applying it to the CIR (Content base Image Retrieval)-tree which is a high-dimensions index structure and constructs an index with some parts of dimensions.

The above bulk loading method calculates the topology of the index structure using the information for the index to be constructed; determines a split strategy based on the topology of the tree; and partitions the data into sub-sets of data through the binarization technique. Finally, a root node is completed, so that an index is constructed.

That is to say, in the step of computing the topology of the tree, the height and the fan-out are calculated by pre-recognizing the information for the index to be composed of a given data set and, at this time, the topology is computed by considering active dimensions and inactive dimensions that the data set has. The topology obtained by the above computation is applied to the binarization of real data set.

The next step is a process to divide the given data set into the sub-sets of data, wherein the number of sub-sets is determined as the fan-out calculated by recursively performing the split strategy determination process and the binarization process.

At last, if a leaf node is generated from the sub-sets of data by performing the recursive split process, MBR information of the leaf node is reflected on a higher node. Through this process, if a non-leaf node is produced, this process is repeatedly performed for the rest of the sub-sets of data. As a result, if a final root node is formed, the bulk loading process is terminated.

Each step described above will be explained in detail hereinbelow.

First of all, the computation of the topology of the tree is a step of calculating in advance a topology of an index structure to be generated and there are a height of the index and a fan-out as the topology to be obtained through the computation. In a high-dimensional indexing structure constructing an index by using some parts of dimensions such as the CIR-tree, inactive dimensions should be considered when computing the topology of the tree since the inactive dimensions are also considered as well as active dimensions when constructing an index node. If partitioning the data set into the sub-sets of data, each sub-set of data can have much more inactive dimensions than that of the original data set. Therefore, a fan-out that each sub-set of data can have is variable and thus it should be recalculated when dividing each sub-set of data.

In order to calculate the height and the fan-out, the maximum number of data objects in a leaf node $C_{max,data}$ and the maximum fan-out of index node (non-leaf node) $C_{max,dir}$ should be determined.

The $C_{max,data}$ can be obtained as follows:

$$C_{max,data} = \left\lfloor \frac{PageSize}{sizeof(DataObject)} \right\rfloor \quad \text{EQ. 1}$$

wherein DataObject means a high-dimensional data object stored in the leaf node; size of (DataObject) represents a size of DataObject and is a sum of a feature vector and a size of RID(Record Identifier) capable of recognizing a record in a data file; and PageSize shows a size of the leaf node or the index node storing the data.

Although the $C_{max,dir}$ is calculated in a manner similar to that used in computing the $C_{max,data}$, it is difficult to determine the exact number of entries which can be stored in the index node. The reason is that it is impossible to know an exact size of each entry since each entry stored in the index node might have different numbers of active dimensions and inactive dimensions. Therefore, instead of determining the exact size of each entry to be stored in the index node, an approximated size of each entry is obtained by using the numbers of inactive dimensions and active dimensions that are calculated based on the MBR information of a current data set. Herein, the MBR means a region including all of certain feature vectors.

The $C_{max,dir}$ is computed as follows:

$$C_{max,dir} = \left\lfloor \frac{PageSize}{sizeof(int) \times (N_{dim,act} \times 2 + N_{dim,inact}) + sizeof(PageID)} \right\rfloor \quad \text{EQ. 2}$$

wherein PageID is a page identifier representing a child page; $N_{dim,act}$ represents the number of active dimensions; and $N_{dim,inact}$ depicts the number of inactive dimensions. In the CIR-tree, feature vectors are stored after being converted into an integer.

The average number of entries stored in the leaf node $C_{eff,data}$ and that of the index node $C_{eff,dir}$ are obtained by multiplying the rate of storage utilization with values determined from the equations EQ. 1 and EQ. 2, respectively, wherein the storage utilization is used to guarantee that nodes can occupy at least a certain space in the constructed index. Accordingly, it is possible to prevent the height from being unnecessarily increased by allowing the nodes to satisfy the storage usability.

Further, the height and the fan-out can be decided based on the values determined from the equations EQ. 1 and EQ. 2. Firstly, the height h can be obtained as follows:

$$h = \left\lceil \log_{C_{eff,dir}} \left( \frac{n}{C_{eff,data}} \right) + 1 \right\rceil \quad \text{EQ. 3}$$

wherein n depicts the total number of data constructing the index.

Once the height of the index to be constructed is decided from the equation EQ. 3, the fan-out in which the current data set can have is in turn calculated. As well as in the process calculating the $C_{max,dir}$, the fan-out is also computed by considering the active dimensions and the inactive dimensions.

The fan-out is ciphered as follows:

$$fanout(h, n) = \min\left( \left\lceil \frac{n}{C_{eff,data} \cdot C_{eff,dir}^{h-2}} \right\rceil, C_{max,dir} \right) \quad \text{EQ. 4}$$

For instance, it is assumed that the number of total dimensions is 100; there are a 1000 number of feature vectors whose number of active dimensions are 40; and PageSize is 4K. In this case, since the sizes of record identifier and page identifier do not critically affect to the size of entry, if we do not consider the size of record identifier and page identifier in the entry of the leaf node and the index node and there is no inactive dimension in the index node, the $C_{max,data}$ and $C_{max,dir}$ are determined as 10 and 12, respectively, from the above equations.

Therefore, when the rate of storage utilization is 80%, the $C_{eff,data}$ and $C_{eff,dir}$ are 8 and 9, respectively. From this information, it is noticed that the height is 4 and the fan-out is 2.

In the meantime, in the process of partitioning the data set into the sub-sets of data, the number of the sub-sets of data is identical to the fan-out determined by repeatedly performing the split strategy establishing process and the binarization process.

First of all, the establishment of the split strategy needs information to be used in binarizing the data set and the information is a split dimension and a split position. The split dimension is determined as a dimension having the largest length among the active dimensions.

Figure 3A:
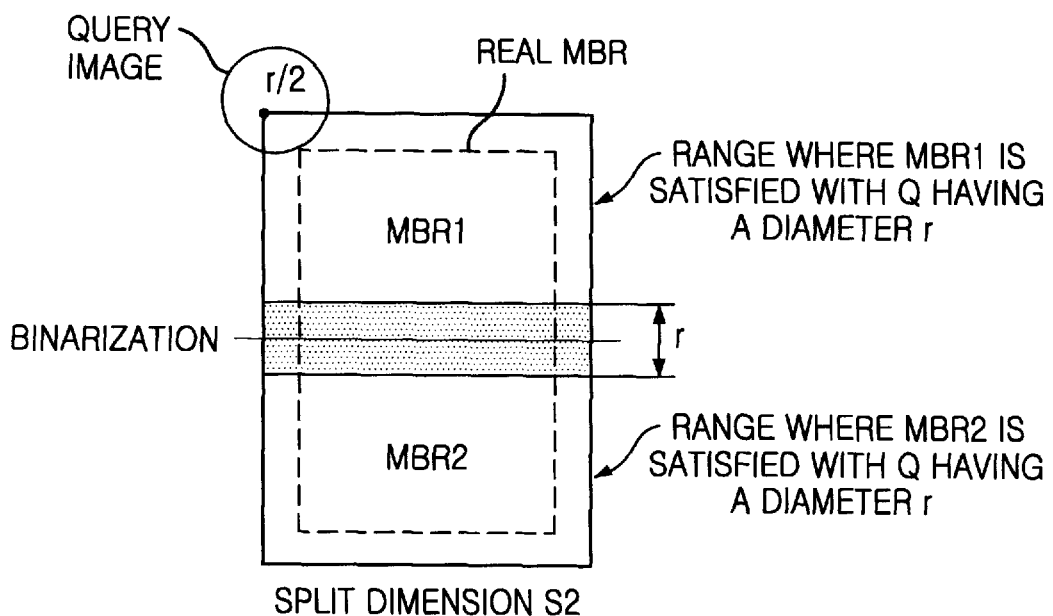
FIG. 3 represents a diagram of explaining a strategy of selecting a split dimension in accordance with the present invention.
Figure 3B:
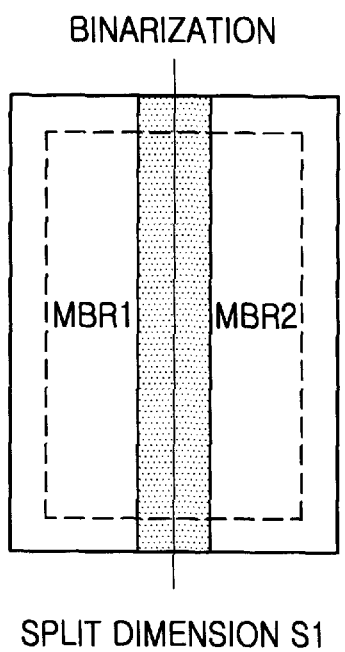

That is, as described in FIGS. 3A and 3B, a location where a range query Q, having a diameter r and intersecting a real MBR represented by a dotted line, can position is determined by increasing each side of the real MBR by r/2.

In FIG. 3A, there is shown a case of splitting the MBR for a S2 dimension. In a query process for finding an MBR within r/2 from the query Q in case two split regions are MBR1 and MBR2, a positional region of the query image Q that is selectable by using a query result satisfying the MBR1 and MBR2 is a rectangle located at outside each of the MBR1 and MBR2. Therefore, in this case, a shaded region becomes the positional region of the query image Q selected by using the query result satisfying both of the two split regions MBR1 and MBR2.

FIG. 3B represents the case of splitting the MBR for a S1 dimension. In this case, a shaded region is determined as a query region capable of including both of the two split regions MBR1 and MBR2 as a query result.

If the split process is performed for the dimension whose feature value is widely spread, a statistics in which a query is approximating to the two split regions, i.e., area of the shaded region, becomes smaller. Therefore, a dimension having the largest length is selected as the split dimension. Since the inactive dimensions have an identical value to each other, they cannot be selected as a largest-lengthed dimension and do not need to be considered in the dimension selecting process.

Further, the remaining dimensions following the active dimensions also do not need to be considered. The reason is that since the MBR is constituted with the inactive dimensions and the active dimensions, there is no effect to constitute the MBR by using some parts of dimensions and rather than the search performance is deteriorated if data is split into dimensions following the active dimension.

Meanwhile, the split position is determined according to an unbalanced split ratio. According to the unbalanced split ratio, the fan-out is divided into 1:r and it is calculated the number of data to be divided into two parts. Through this process, a split interval (split range) is chosen instead of determining an exact split position. By selecting the split interval, it is possible to reduce a time required for the binarization, so the entire bulk loading time is also reduced. Through the use of the following equations EQ. 5 and EQ. 6 based on the information representing a topology of a tree, there are calculated the maximum number of data entries ($N_{max,dataleft}$) and the minimum number of data entries ($N_{min,dataleft}$) which a left split data set can contain. As a result, the split interval is decided as ($N_{min,dataleft} - N_{max,dataleft}$).

$$N_{max,dataleft} = l \cdot C_{max,tree}(h-1) \quad \text{EQ. 5}$$

$$N_{min,dataleft} = N - r \cdot C_{max,tree}(h-1) \quad \text{EQ. 6}$$

wherein N represents the number of data included in a current data set to be split and $C_{max,tree}(h-1)$ is a maximum number of entries that a tree whose height is (h-1) can have.

In the above computation, a height balanced index tree can not be constructed when there happen following cases: $N_{min,dataleft}$ becomes smaller than 0 or a very small value compared with the split ratio and $N_{max,dataleft}$ becomes larger than N.

Figure 4A:
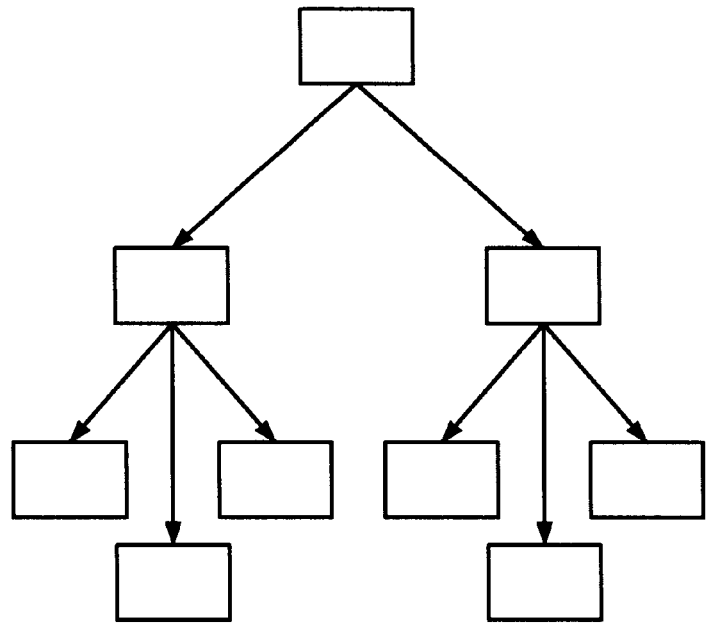
FIG. 4 is a diagram of describing a problem occurring when computing a shape of a tree in accordance with the present invention.
Figure 4B:
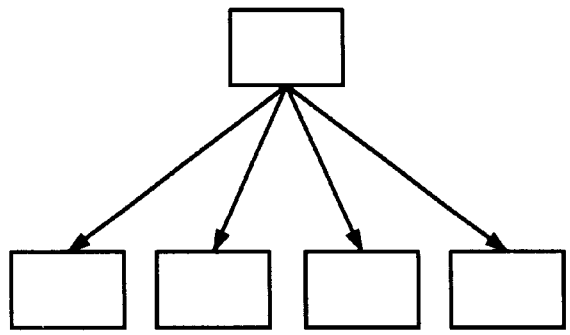

As illustrated in FIG. 4, a tree in FIG. 4A shows a shape calculated by considering that entries are averagely entered into the data node and the index node. However, the height of the tree can be reduced if recalculating as the data node and the index node contain the maximum number of entries therein. In this case, the maximum number of data to be entered into the left tree becomes larger than the number of entire data. This is due to using a value multiplied with the storage utilization when computing the height and the fan-out. Therefore, it is calculated by computing a minimum number of data entries($C_{min,tree}$) that a sub-tree must have.

Herein, the $C_{min,tree}$ is considered as having a minimum number of entries(MinFill) to fill the node for its computation. The MinFill means a minimum number of data that a node should contain therein and it is represented by a ratio of a sum of sizes of data in the node to the size of the node. Each of the nodes should include data therein in a ratio larger than the MinFill. Therefore, in case the $N_{min,dataleft}$ has a value smaller than 0 or a very small value compared with the split ratio, the minimum number of data, which the left data set can have, is ciphered by determining the $C_{min,tree}$. Moreover, if the $N_{max,dataleft}$ becomes larger than N, the $N_{max,dataleft}$ is determined by computing a residue derived from calculating a minimum number data that a right data set can include therein.

In the meantime, the binarization process in which the given data set is bi-partitioned using the selected dimensions is performed based on the topology of the tree and the split strategy obtained by the above processes and the binarization can be classified into an external bisection process and an internal bisection process. If the data set can not be loaded into a memory, the data set is bisectioned according to a pivot value resulted from performing the internal bisection through a sampling process for the data set.

After then, the remaining data is also bisectioned according to the pivot value and the binarization process is terminated if the split position is included in the split interval. The internal bisection means that all of the data are loaded into the memory and, in this case, the data are bisectioned according to the pivot value. Some parts of the memory are used to thereby rapidly perform the internal bisection process and the external bisection process is executed by using files. The internal bisection represents a case in which the data set to be bisectioned can be loaded into the memory. In this case, the pivot value is determined by sampling some data.

If the pivot value is decided through the above process, the data set is bisectioned according to the selected pivot value. That is, if their values are smaller than the pivot value, the data are classified to a left set and, if otherwise, they are classified to a right set. If the split position is involved in the split interval, the bisection process is terminated and, if otherwise, the process is repeated. In the repeated process, the bisection process is performed only for the data including the split interval.

However, when executing the bisection process, there might occur a problem described in FIG. 5.

Figure 5A:
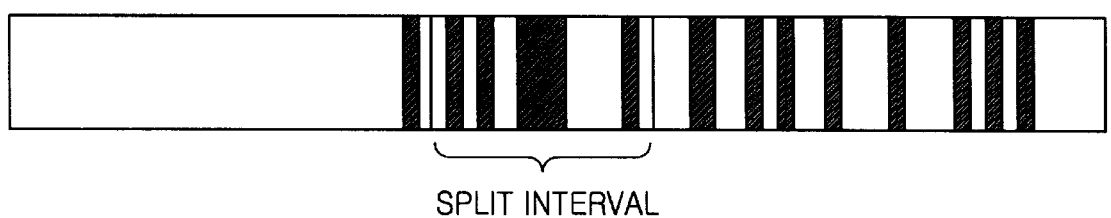
FIG. 5 illustrates a diagram of showing an example in which binarization is not correctly performed in UBBT in accordance with the present invention.

As shown in FIG. 5A, for the data set having a very unbalanced distribution, data whose split dimensions are identical to each other may position through the split range. In this case, the pivot value cannot be included in the split interval and the bisection process cannot be stopped. Therefore, in this case, although the bisection process is performed by appropriately selecting one point in the split interval, since the bisection method proposed by the UBBT does not employ the sort, the data having a same split dimension value are not gathered together.

Figure 5B:
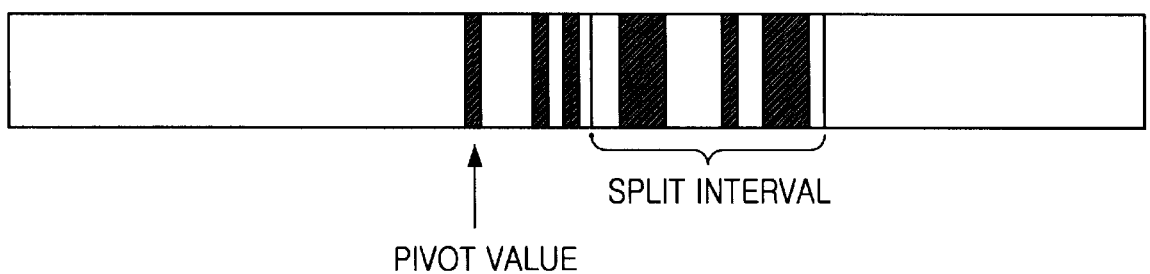

Likewise a case illustrated in FIG. 5B, if the data whose position of a split dimension value is the same as that of the pivot value becomes within the split interval while the pivot value is not included in the split interval, the bisection process is terminated at a position resulted from adding the number of data having a same value to the pivot value.

However, this is also impossible because the data are not sorted. Therefore, in order to the above problem, the present invention separately manages the data whose values are identical to the pivot value and, if the positions of the data are included in the split interval, divides the data at a position of the split interval. If otherwise, the data are classified to a left data set and the bisection process is performed again for the remaining data.

FIG. 6 presents bisection methods applied to the present invention. In the cases of FIGS. 6A and 6B, the bisection process is performed just one time, whereas in FIGS. 6C and 6D, one more performance of bisection is required.

Figure 6A:
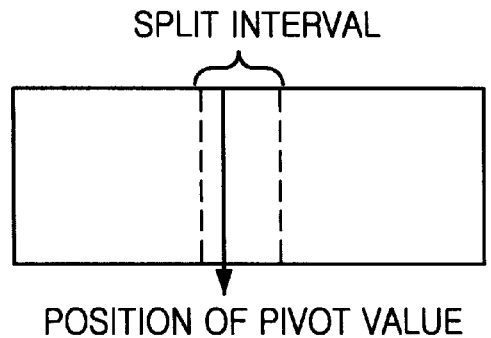
FIG. 6 describes a diagram of providing methods for performing binarization in accordance with the present invention.
Figure 6B:
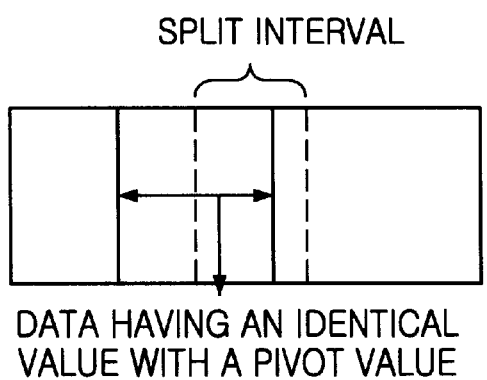
Figure 6C:
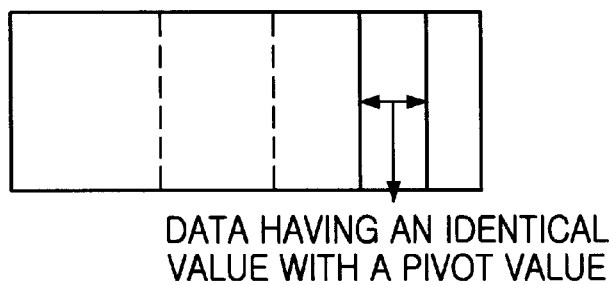
Figure 6D:
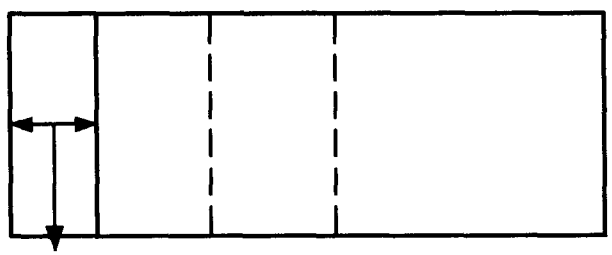

As for FIG. 6C, when a repetitive bisection is carried out, a split position becomes included in a split interval. Accordingly, bisection process can be terminated. On the other hand, in the case of FIG. 6D, if there is little data in a left data set, the left data set is not divided any more although one more bisection is performed. In such event, data having an identical value with the pivot value are classified into the left data set, and repetitive bisections are performed for the rest of data until the split position comes to be included in the split interval. If the split position is included the split interval, the bisection process is terminated.

Figure 6E:
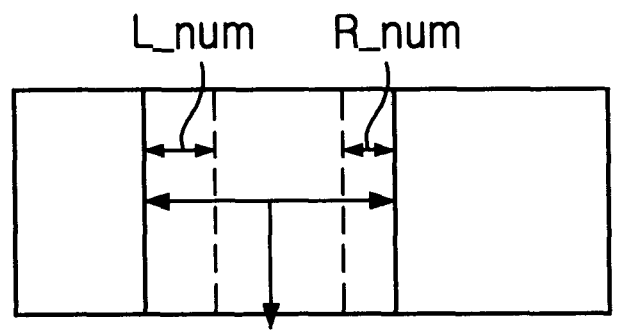

The case of FIG. 6E is about when the position of data having the same value as the pivot value includes in the split interval. Values representing the positions of data from the split interval are measured, wherein the values mean the number of data belonging to the left and right data sets L_num and R_num, respectively.

Values representing the number of objects whose value of split dimension is equal to pivot and which is not included split interval are measured, wherein the values mean the number of data belonging to the left and right data sets L_num and R_num, respectively.

Herein, the L_num and R_num are the numbers of data having the identical value with the pivot value except for those included in the split interval.

If the L_num is larger than the R_num, the split position is decided to be $N_{max,dataleft}$ and if not, $N_{min,dataleft}$ is determined as the split position. Once the split position is defined, the determined number of data is shifted from the right data set to the left data set and the bisection is completed.

When we reflect the region information of nodes generated from the above-described bisection on a higher level, we can meet the overflow phenomenon because we could not expect the exact number of entries that a higher index node can store.

In this case, the split is attempted to process the overflow phenomenon. During the split process, however, the two divided nodes may be overlapped.

The overlapping of the two split nodes is caused since the data set is split with an unbalanced ratio. When the overflow happens, a great amount of cost is required so as to find a dimension and position devoid of the overlapping, which in turn increasing the time for the constitution of the index structure. In order to solve this problem, in the present invention, a differential split ratio is applied to the bisection of data set.

Figure 7:
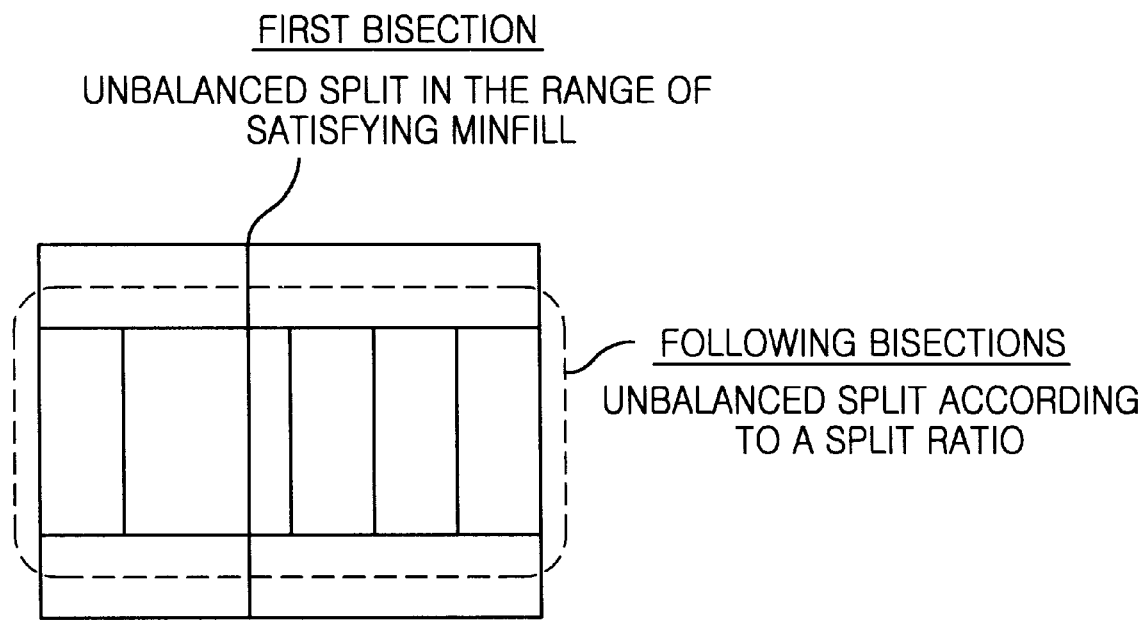
FIG. 7 is a diagram of showing a binarization through the use of an unbalanced split ratio in accordance with the present invention.

As illustrated in FIG. 7, in a first bisection process of data set, which will be constituted as an index node, a differential split is performed within the range of satisfying a minimum value to fill a page(MinFill). For bisections after performing the given differential split, the split dimension and the split position which were used in the first split are stored in order to carry out the split which satisfies the MinFill without accompanying the overlap when the overflow occurs. However, when a lot of inactive dimensions are generated at one side, there still exists a high likelihood that the overflow occurs at that side. In such event, expansion to a super node is considered as a solution.

The following is a description of the process for creating an index node (non-leaf node).

A data set is repeatedly binarized into sub-sets of data. During the recursive bisection process, if the fan-out that the sub-sets of data have is determined as 1, the bisection process proceeds to a lower level. The bisection continues to be processed for a data set of the lower level until the height becomes 1. If the height becomes 1, a leaf node is constituted with the data of that sub-set of data and information for the leaf node is reflected on the higher node.

When the construction of index nodes for the respective sub-sets of data, as recited above, is completed through the above-stated processes, then the right data set of the higher level is subject to the bisection. If the split is completed from the highest level to the sub-set of data located at the last right section, the root node is generated and the process for creating the index is completed.

For the construction of the above-mentioned index structure, an MBR of a leaf node must be generated at first. The MBR comprises active and inactive dimensions, and becomes an entry of a current node along with a node pointer. When the entries get reflected on the higher node, the overflow can be caused.

The overflow may be coped with by either splitting the node or expanding the node into a super node. For processing the overflow, a differential split ratio was applied to the split of a data set. First of all, by using a split dimension used for the first split, which was previously performed to split the data set into sub-sets of data, and the pivot value, the node where the overflow occurs is subject to the split. If the node is successfully split, the split node and a newly generated node are all reflected on the higher level. If not, the expansion to the super node is performed.

Figure 8:
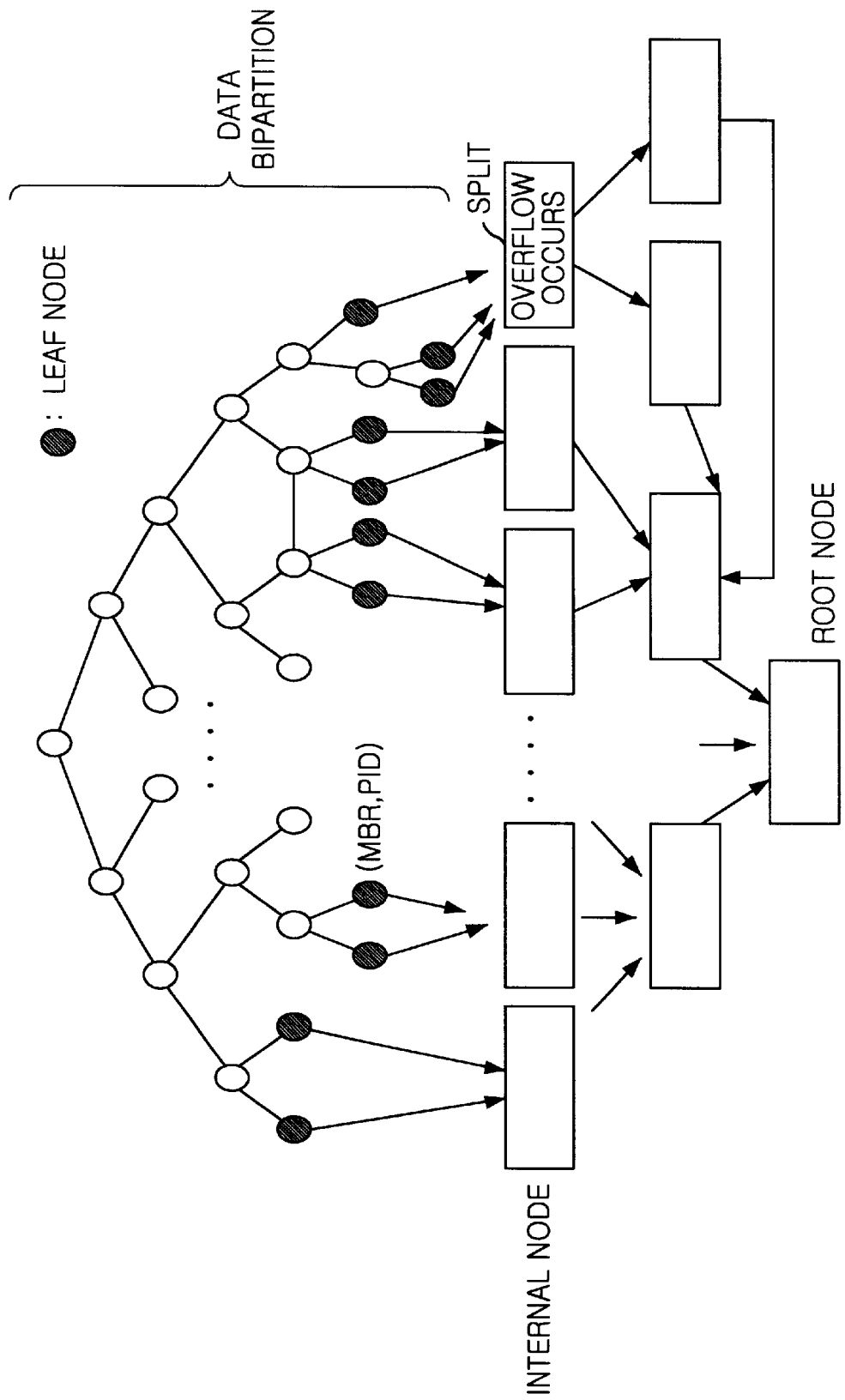
FIG. 8 provides a diagram of illustrating an entire flow of constructing an index structure by using a bulk loading in accordance with the present invention.

FIG. 8 describes the overall method of constructing the index structure through a bulk loading in accordance with the present invention. A leaf node is generated through the recursive bisection process, and an index node is generated by constituting the MBRs of the leaf node.

In case the overflow occurs as shown in the right bottom of FIG. 8, at first the split is attempted but only if the split does not accompany the overlapping. If it is impossible to split the node without the overlapping, the expansion to the super node is processed.

Figure 9:
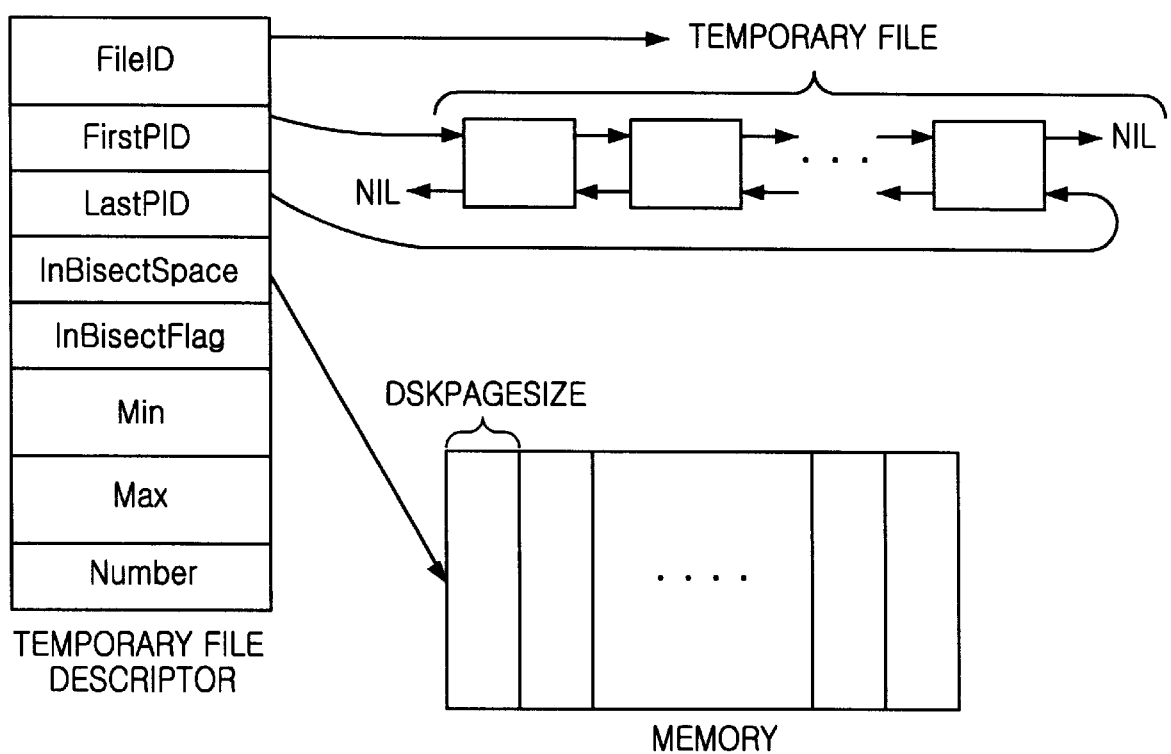
FIG. 9 depicts a diagram of presenting a structure of a temporary file descriptor for storing split information in a split process in accordance with the present invention.

FIG. 9 illustrates a structure of a temporary file descriptor (TempDesc) for loading and storing the data during the bisection process therefor.

There is a file identifier (FileID) which identifies the temporary file storing and loading the data during the external bisections. In accordance with the present invention, the input and output of data is performed on a page unit. In order to achieve this input and output of data, the pages within the temporary file are connected by a dual connection list, wherein the TempDesc structure has a FirstID, which stores the page identifier of first page in the temporary file, and a LastID, which stores the page identifier of first page in the temporary file, of the connection list.

In order to decide the pivot value for internal and external bisections, a memory for a sampling is required. There are an InBisectSpace identifying a starting point of the memory and an InBisectFlag for deciding whether the internal bisection will be performed or the external bisection will be performed.

There are also Min and Max, wherein the Min indicates the minimum value and Max the maximum value for each dimension of present possessed data set. Further, there is a Number representing the number of the present possessed data. The temporary file descriptor is an important data structure used for keeping information for the data while the bulk loading method is in progress.

Figure 10:
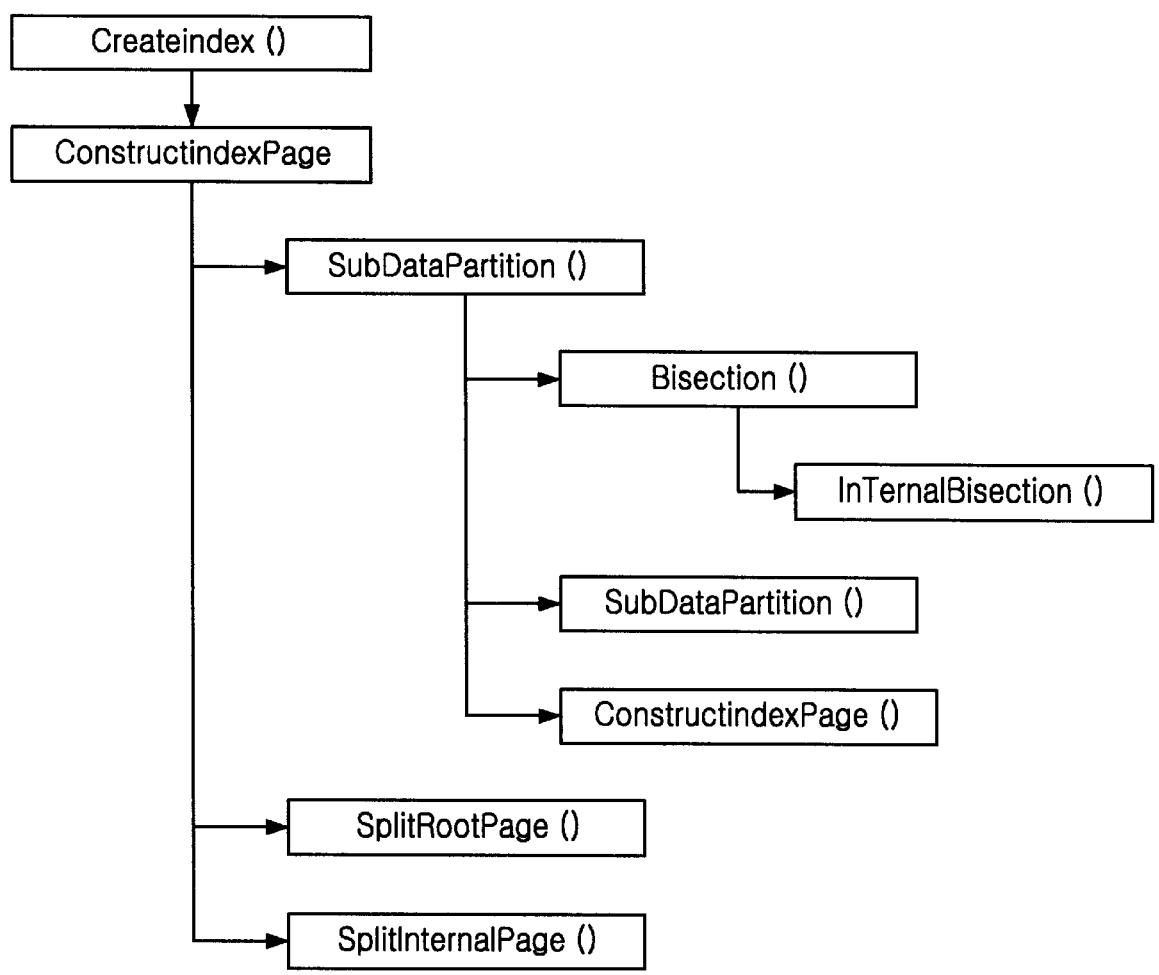
FIG. 10 is a block diagram showing the subroutines, components of the create index operation, in accordance with the present invention.

FIG. 10 depicts a block diagram for showing an algorithm of the bulk loading method in accordance with the present invention.

As illustrated in FIG. 10, a ConstructIndexPage( ) function for creating an index page having a series of feature vector sets is called in a CreateIndex( ) function which is a main function for constructing an index according to the bulk loading method. A SubDataPartition( ) function for dividing a given data set into a predetermined number of sub-sets, a SplitRootPage( ) function for splitting an overflow of a root page, and a SplitInternalPage( ) function for splitting an overflow of a current page are respectively called in the ConstructIndexPage( ) function.

A Bisection( ) function for binarizing the given data set according to a split strategy, a SubDataPartition( ) function and a ConstructIndexPage( ) function are individually called in the SubDataPartition( ) function. An InternalBisection( ) function for binarizing a data set loaded on the memory based on the pivot value is called in the Bisection( ) function.

Figure 11:
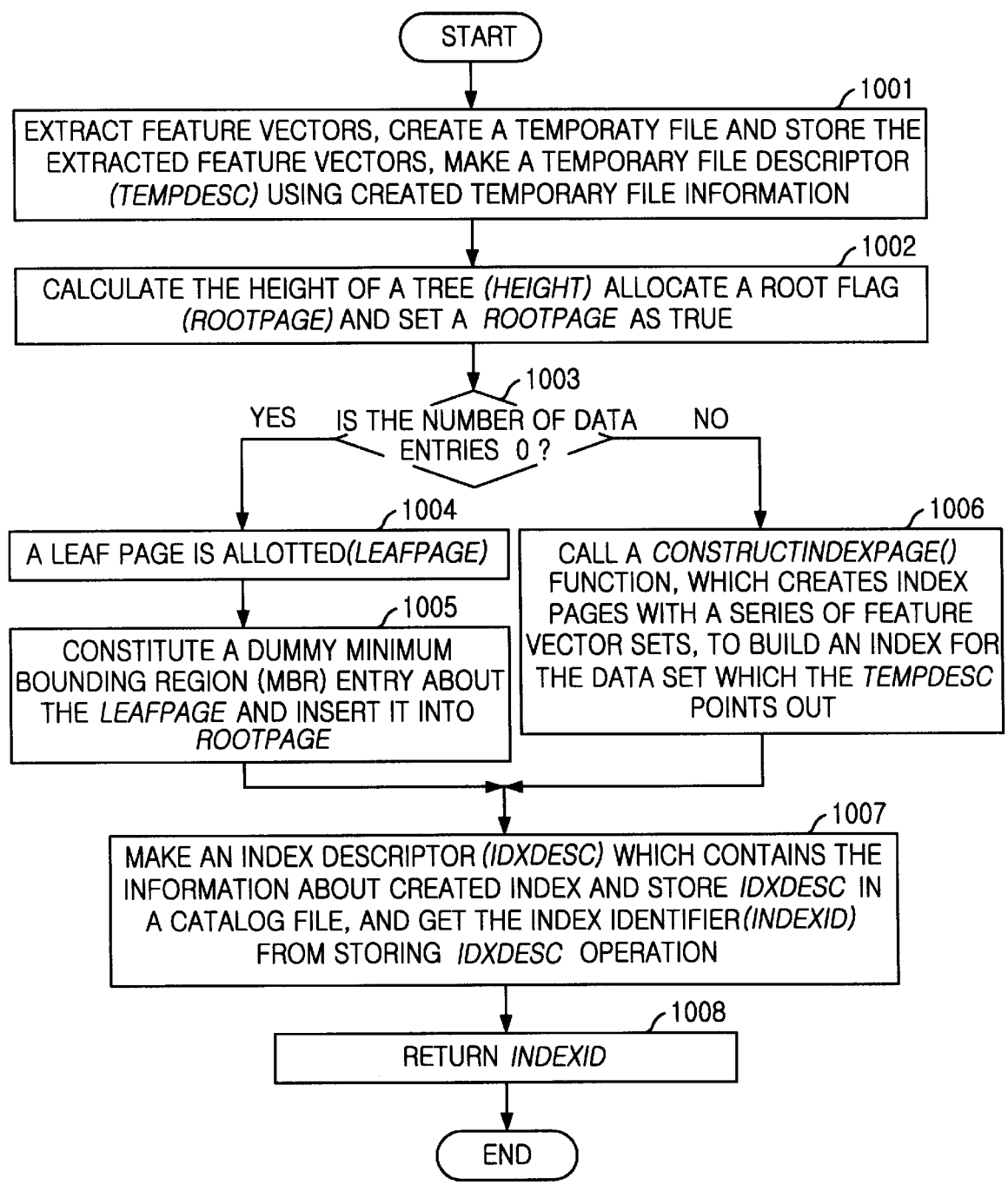
FIG. 11 illustrates a flow chart of a main function CreateIndex( ) for constructing an index through the bulk loading in accordance with the present invention.

FIG. 11 provides a flow chart of the CreateIndex( ) function, a main function for constructing the index according to the bulk loading method of the present invention.

As described in FIG. 11, the CreateIndex( ) function creates an index with TotalDim as a total dimension and ActiveDim as a active dimension for a field indicated by a field describer (FieldDesc) derived from a database and returns the created index identifier (IndexID) to the database.

To be specific, a feature vector is extracted in order to construct the index, then a temporary file comprising that feature vector is created, and then the contents of the TempDesc is filled at step 1001. After the height of the tree (Height) is measured, a root page (RootPage) is allocated and a RootFlag is set up as true at step 1002. When the process of the step 1002 is achieved, the judgment is made about whether the number of data entries for which the index will be constructed is zero or not at step 1003. When the number of entries is zero, a leaf page is allocated at step 1004 and a dummy entry for the leaf page is constituted and in turn reflected on the root page at step 1005. That is, when there is no entry for constructing the index, an empty index is generated.

On the other hand, in case the number of entries is not zero, a ConstructIndexPage( ) function of FIG. 12, a function which creates individual index pages with a series of feature vector sets, is utilized in order to build an index for the data set which the TempDesc points out at step 1006.

After the above step 1005 or 1006 is finished, a series of steps of creating an index descriptor IdxDesc, storing the created IdxDesc in a catalog file in which information for the index is stored, and receiving an index identifier (IndexID) is performed at step 1007. For the next, the given IndexID is returned and the loop of the main function is ended at step 1008.

Figure 12A:
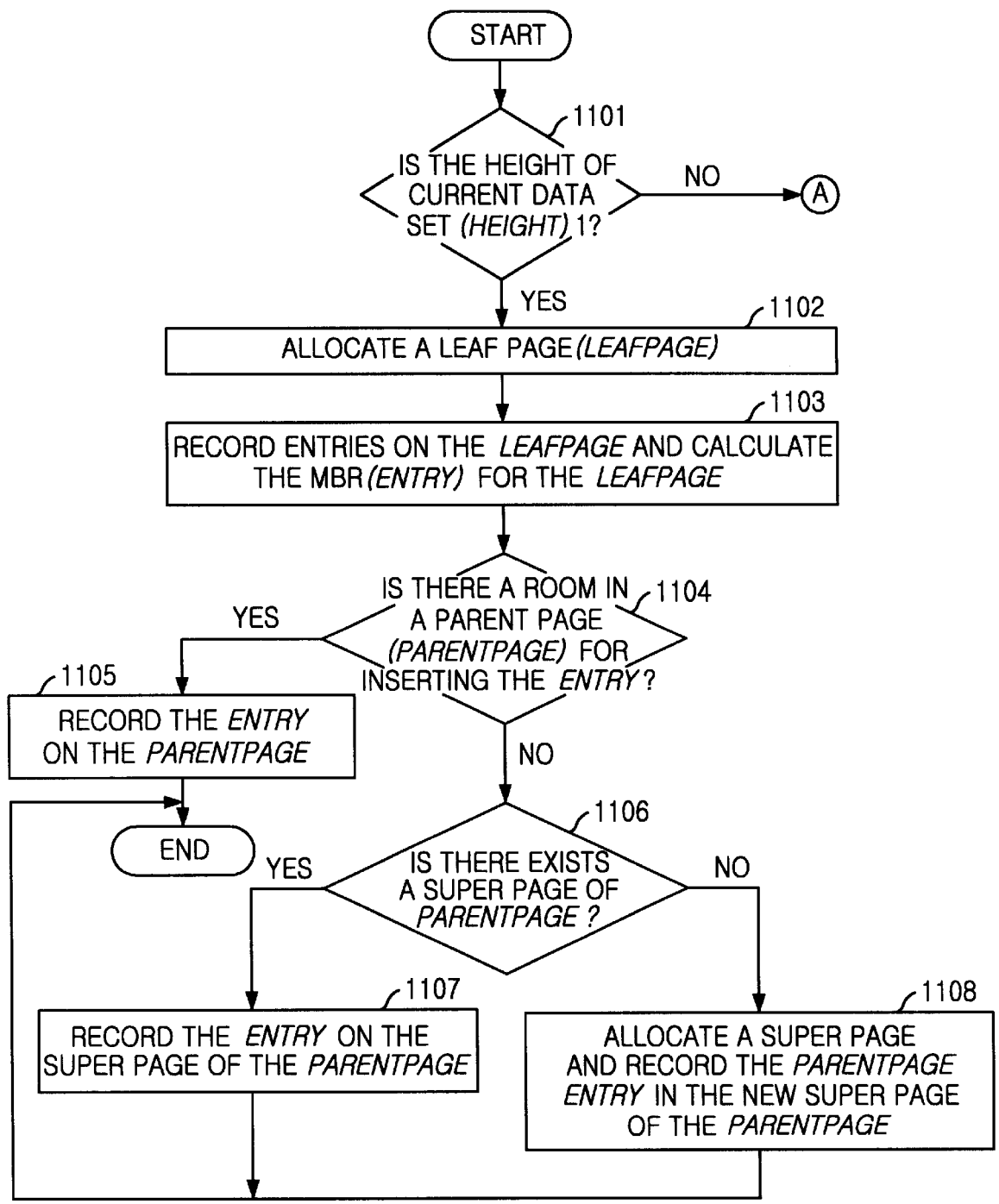
FIG. 12 is a flow chart of a ConstructIndexPage( ) function, called in the CreateIndex( ) function shown in FIG. 11, for making an index page using a sequence of feature vector sets.
Figure 12B:
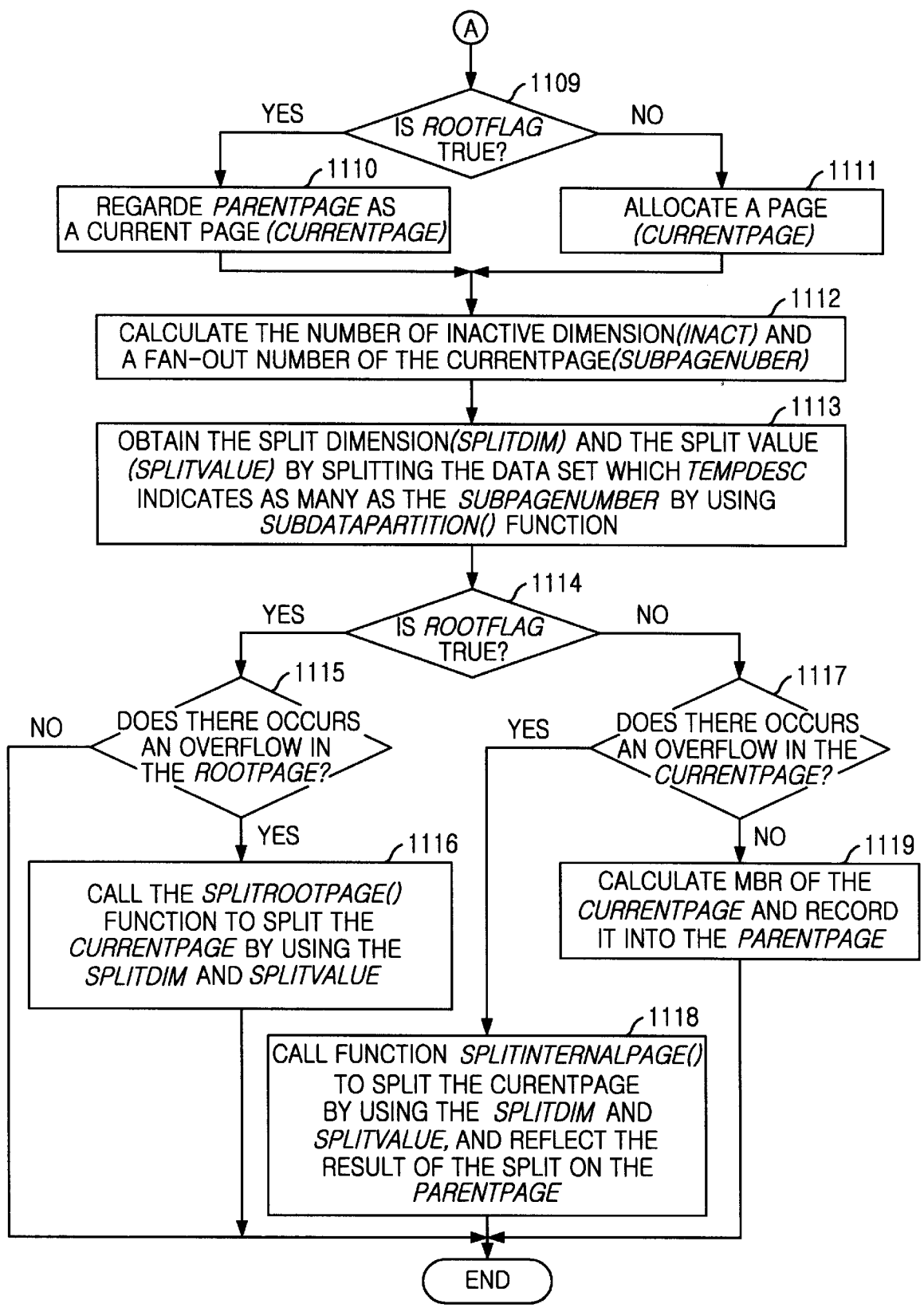

FIGS. 12A and 12B show a flow chart of the ConstructIndexPage( ) function which is called in the CreateIndex( ) function of FIG. 11. The ConstructIndexPage( ) generates index pages with a feature vector set.

As shown in FIGS. 12A and 12B, the ConstructIndexPage( ) function creates index pages while splitting the data set. The ConstructIndexPage( ) function is called whenever the Height is reduced until a leaf page is built.

To be specific, judgment is made about whether the height of the current data set (Height) is 1 or not at step 1101. When the Height is found to be 1, a leaf page (LeafPage) is allocated at step 1102. Then the entries are recorded on the LeafPage, and the MBR for the LeafPage is calculated at step 1103.

For the next, it is checked whether there is a room in a parent page (ParentPage) for inserting the MBR (Entry) of the LeafPage at step 1104. When there is the room for the Entry insertion, the Entry is recorded on the ParentPage and the operation of the ConstructIndexPage( ) function is ended. On the other hand, if there is no room for the Entry insertion, it is checked whether there exists a super page of the ParentPage at step 1106.

When there exists the super page of the ParentPage, the Entry is recorded on the super page of the ParentPage at step 1107. However, when there exists no super page of the ParentPage, a new super page of the ParentPage is allocated and the Entry is recorded in the newly created super page of the ParentPage at step 1108. Then the loop of the ConstructIndexPage( ) function is terminated.

Back to the process of the step 1101, when the Height is not 1, judgment is made about whether the RootFlag is true at step 1109. RootFlag is true only if it is called from CreateIndex( ) function, otherwise, i.e, called from SubDataPartition( ) function, it is false. When the RootFlag is true, the ParentPage is regarded as a CurrentPage at step 1110. If the RootFlag is not true, a non-leaf page (CurrentPage) is newly allocated at step 1111. Afterwards, the number of inactive dimensions (Inact) and a fan-out (SubPageNumber) of the current data set are calculated at step 1112. Then the split dimension (SplitDim) and the split value (SplitValue) are obtained by splitting the data set which the temporary file descriptor (TempDesc) indicates as much as the SubPageNumber at step 1113. Then the truth of the RootFlag is determined at step 1114. If the RootFlag is true, it is determined whether there occurs an overflow in the root page (RootPage, i.e., CurrentPage) at step 1115. On the other hand, if the RootFlag is not true, judgment is made about whether there occurs an overflow in the non-leaf page (CurrentPage) at step 1117.

Figure 14:
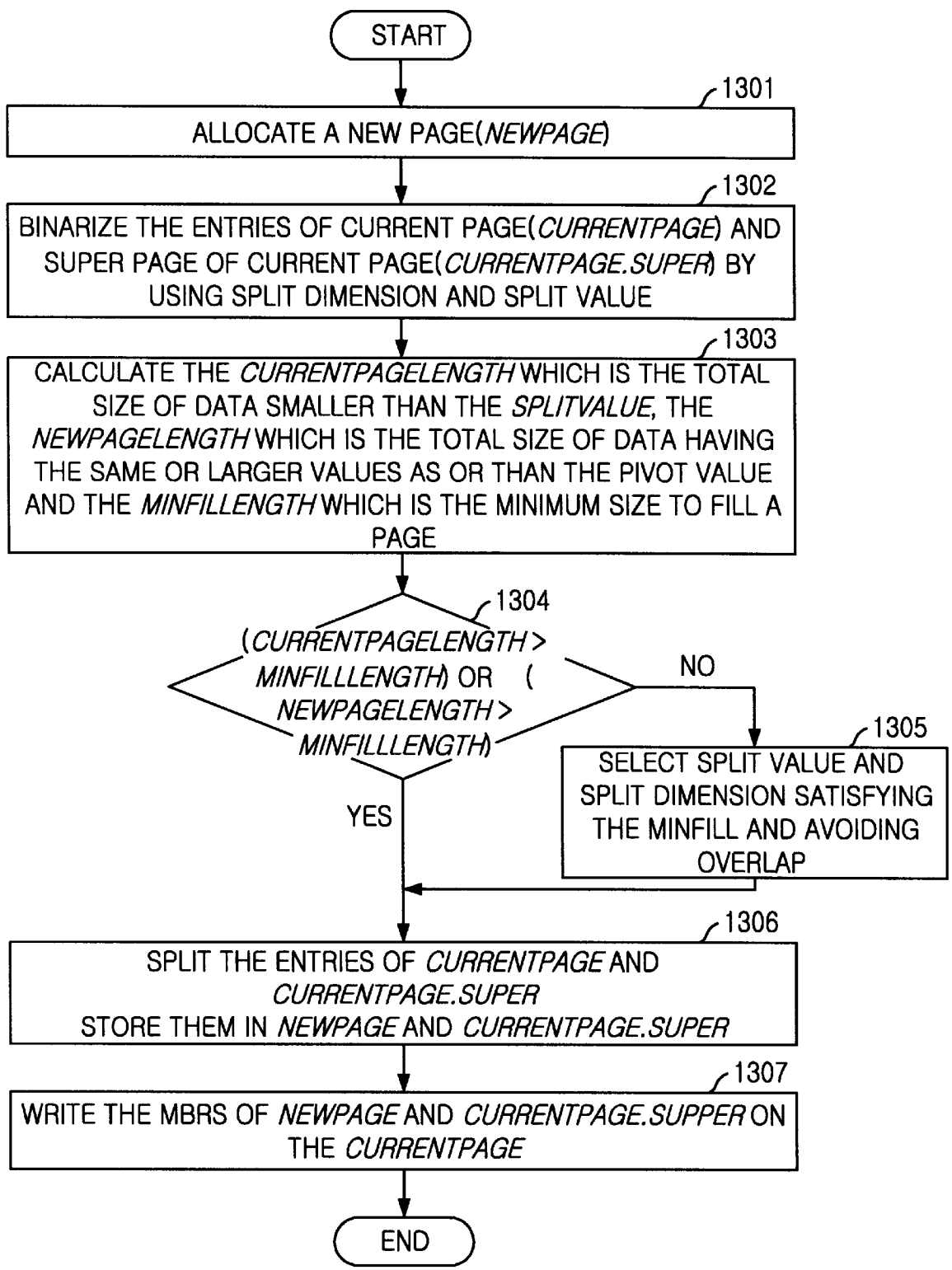
FIG. 14 describes a flow chart of a SplitRootPage( ) function, called in the ConstructIndexPage( ) function, for solving the overflow of a root page by splitting the root page.

As a result of the step 1115, when the overflow is found to occur in the RootPage, a SplitRootPage( ) function as illustrated in FIG. 14 is called to split the CurrentPage by using the SplitDim and SplitValue at step 1116. On the other hand, when no overflow is found in the RootPage, this process is finished.

Referring to the step 1117 again, if there occurs the overflow in the non-leaf page, a SplitInternalPage( ) function in FIG. 15 is called to split the CurrentPage by utilizing the SplitDim and SplitValue, wherein the result of the split becomes reflected on the ParentPage at step 1118. However, as a result of the step 1117, when no overflow is found in the CurrentPage, the MBR of the CurrentPage is calculated and recorded in the ParentPage at step 1119. Then the process is completed.

Figure 13A:
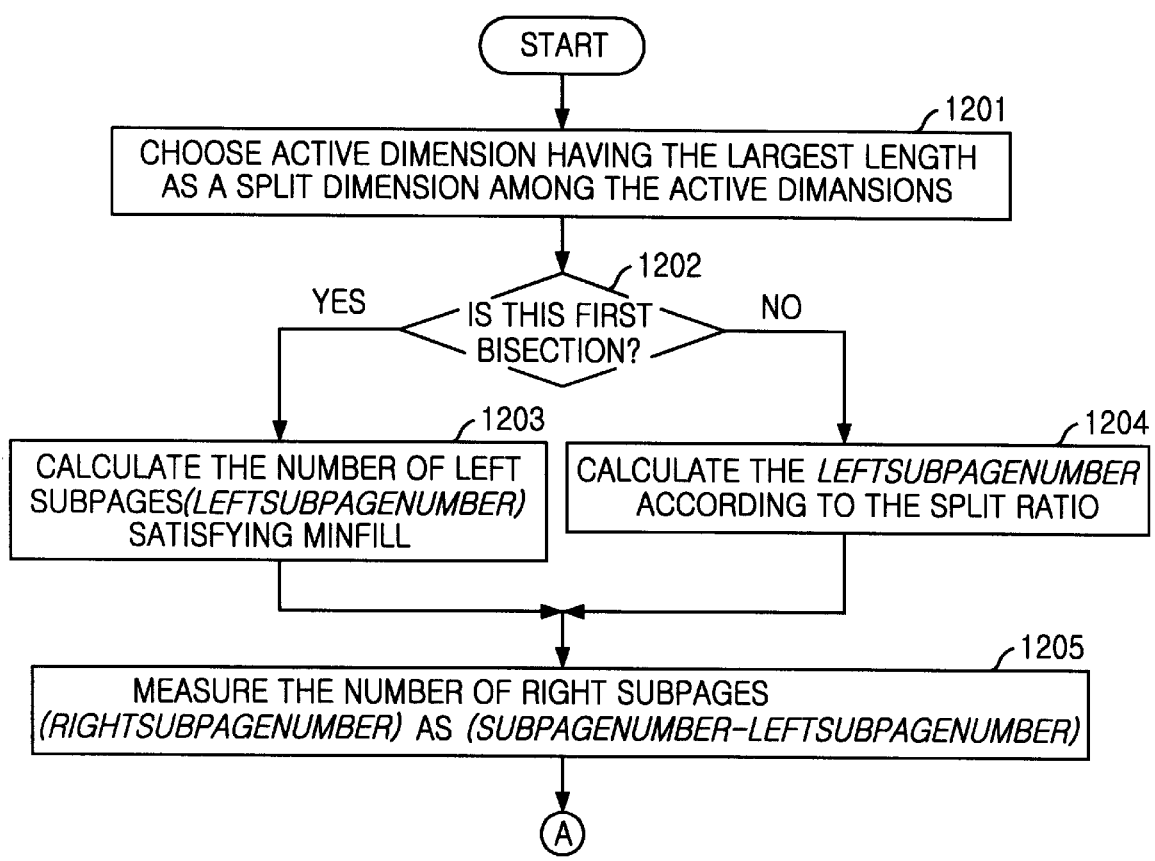
FIG. 13 represents a flow chart of a SubDataPartition( ) function, called in the ConstructIndexPage( ) function, for dividing the data set into a given number of sets.
Figure 13B:
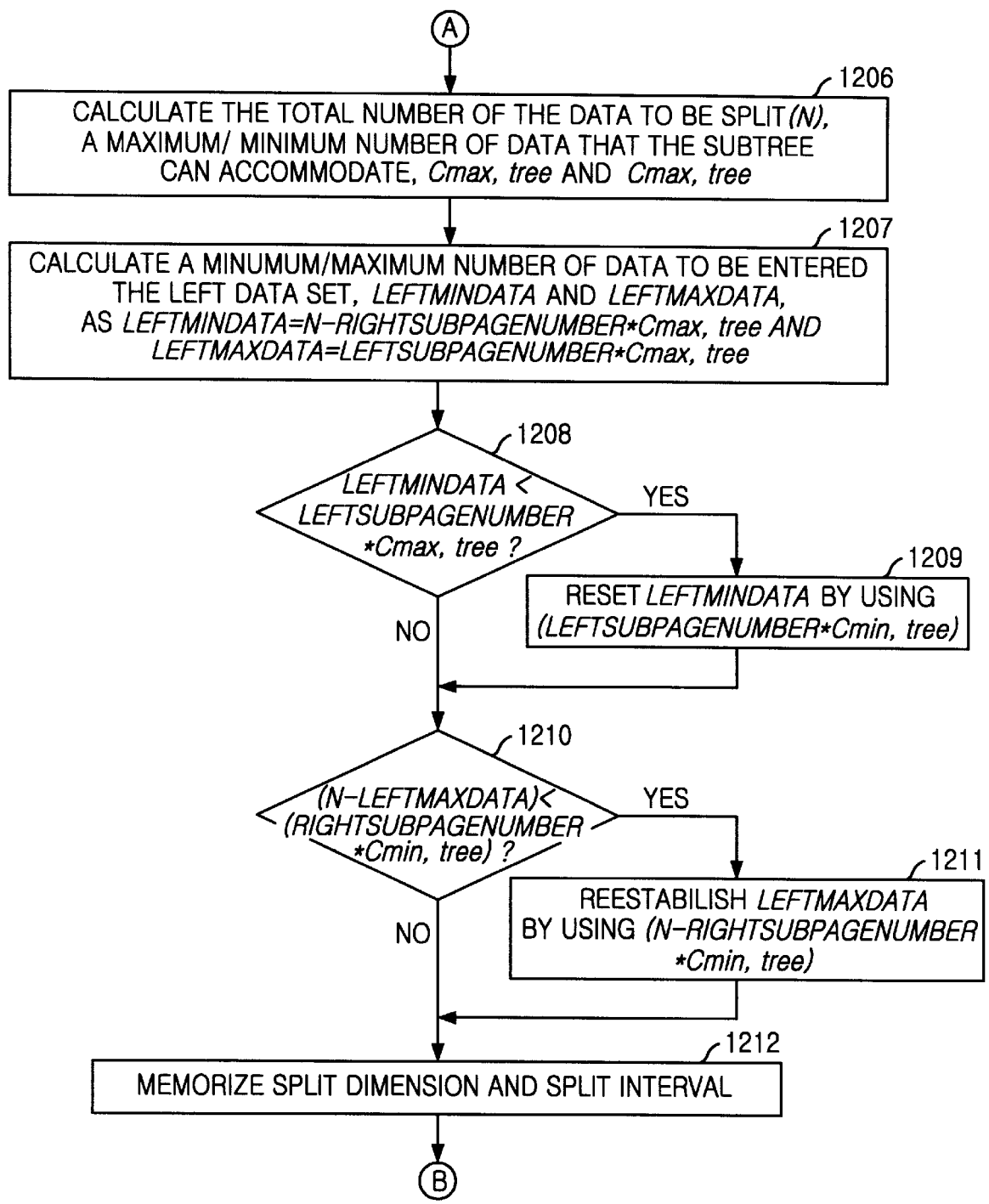
Figure 13C:
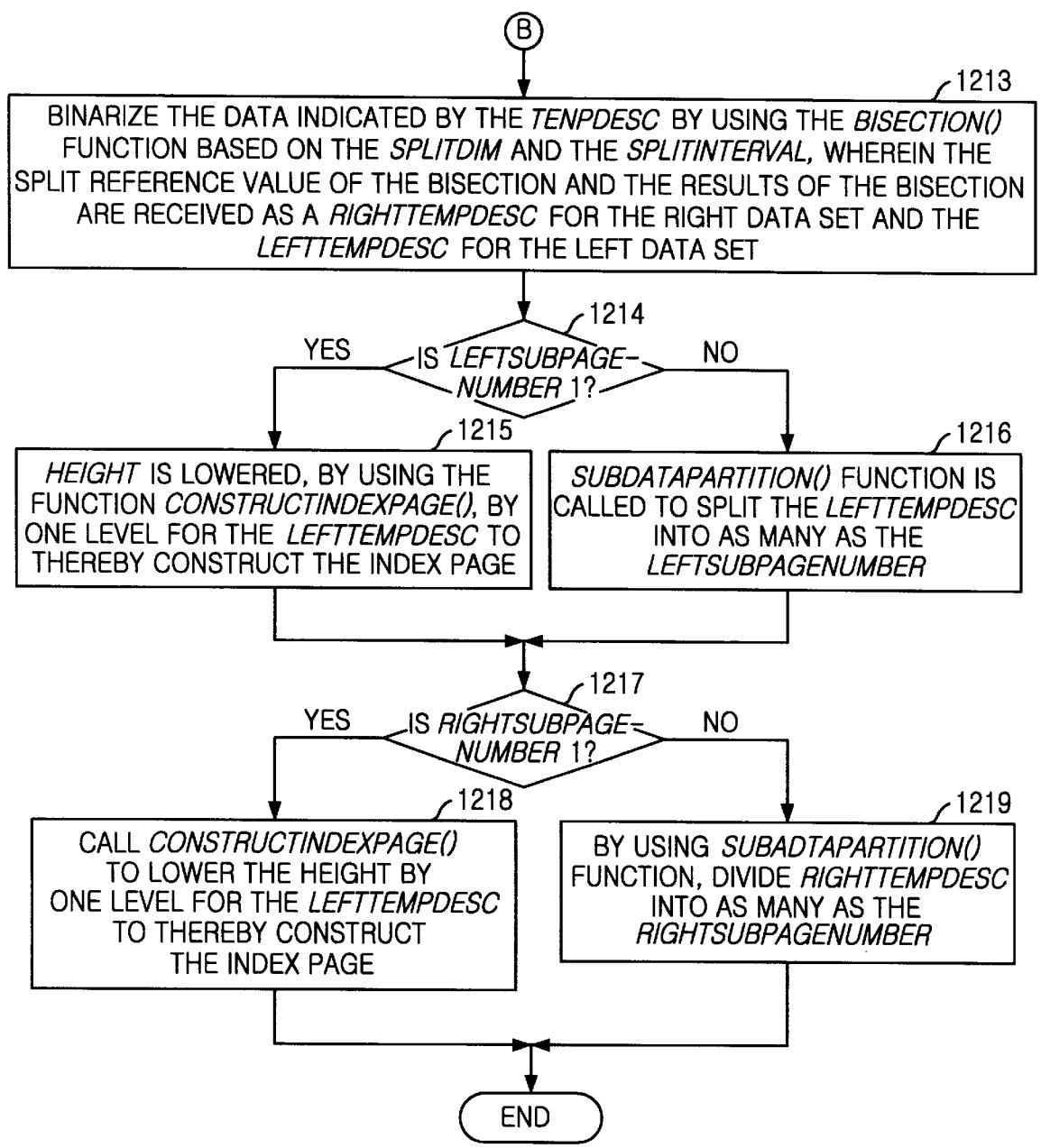

FIGS. 13A to 13C present a flow chart of a SubDataPartition( ) function which is called in the ConstructIndexPage( ) function shown in FIG. 12 so as to split the given data set into the determined number of sub-sets of data.

As described in FIGS. 13A to 13C, the SubDataPartition( ) function divides the data set into subsets of data as many as the sub-page number (SubPageNumber).

Namely, an active dimension having the largest length is chosen as a split dimension (SplitDim) among the active dimensions (step 1201), and it is determined whether the bisection is the first bisection or not at step 1202. When the bisection is concluded as the first bisection, the number of left sub-pages (LeftSubPageNumber) satisfying a MinFill for a node is calculated at step 1203. In case the bisection is not the first bisection, the LeftSubPageNumber is counted according to the split ratio at step 1204.

If the calculation of the step 1203 or 1204 is completed, the number of right sub-pages (RightSubPageNumber) is measured as (SubPageNumber—LetSubPageNumber) at step 1205. Afterwards, the total number of the data to be split(N), $C_{max,tree}$ and $C_{min,tree}$ are calculated at step 1206, wherein the $C_{max,tree}$ means a maximum number of data which a tree can accommodate and the $C_{min,tree}$ indicates a minimum number of data that the tree can accommodate.

A minimum number of data to be entered the left data set (LeftMinData) and a maximum number of data to be entered the left data set (LeftMaxData) are calculated by using the equations as following; LeftMinData=N−RightSubPageNumber*$C_{max,tree}$ and LeftMaxData= LeftSubPageNumber*$C_{max,tree}$ at step 1207. Then it is determined whether the LeftMinData is smaller than the (LeftSubPageNumber*$C_{max,tree}$) or not at step 1208. As a result of the judgment, if the LeftMinData is smaller than the (LeftSubPageNumber*$C_{max,tree}$), the LeftMinData is reset by using the (LeftSubPageNumber*$C_{min,tree}$) at step 1209. Then this process proceeds to the next step 1210.

In the step of 1208, if the LeftMinData is not smaller than the (LeftSubPageNumber*$C_{min,tree}$), judgment is made about whether the (N−LeftMaxData) is smaller than the (RightSubPageNumber*$C_{min,tree}$) at step 1210.

If the (N−LeftMaxData) is smaller than the (RightSubPageNumber*$C_{min,tree}$), the LeftMaxData is re-established by using the (N−RightSubPageNumber *$C_{min,tree}$) at step 1211 and this procedure goes to the next step 1212. If otherwise, the split strategy—SplitDim and the split interval (SplitInterval) representing the number of minimum and maximum data entries the left data set can have—is memorized at step 1212.

The data indicated by the temporary file descriptor (TempDesc) is binarized by using a Bisection( ) function described in FIG. 16 based on the SplitDim and the SplitInterval, wherein the split reference value of the bisection and the results of the bisection are received as a RightTempDesc, which contains the information about right sub-data set, for the right data set and the LeftTempDesc, which contains the information about left sub-data set, for the left data set at step 1213. At this time, it is figured out whether the LeftSubPageNumber is 1 or not at step 1214. If the LeftSubPageNumber is 1, the Height is lowered, by using the ConstructIndexPage( ) function shown in FIG. 12, by one level for the left data set to thereby construct the index page. In other words, the bisection is performed at a lower level at step 1215.

On the other hand, as a result of the step 1214, if the LeftSubPageNumber is found to be not 1, the SubDataPartition( ) function in FIG. 13 is called to split the left sub-data set into as many as the LeftSubPageNumber at step 1216. In other words, the recursive bisection is implemented for the left data set.

Then, it is checked whether RightSubPageNumber is 1 or not at step 1217. If the RightSubPageNumber is 1, the ConstructIndexPage( ) function is called in order to lower the Height for the right sub-data set by one level to thereby construct the index page at step 1218. On the other hand, if the RightSubPageNumber is not 1, the right sub-data set is divided into as many as the RightSubPageNumber by using SubDataPartition( ) function at step 1219. Then the procedure is terminated.

FIG. 14 is a flow chart of a SplitRootPage( ) function for performing the split in case an overflow phenomenon occurs in a root page (RootPage). The SplitRootPage( ) function is called from the ConstructIndexPage( ) function as presented in FIG. 12.

As shown in FIG. 14, the SplitRootPage( ) function is for dealing with the possible overflow of a RootPage. The SplitRootPage( ) function always splits the RootPage and dose not expand the RootPage into a super page. When the RootPage is divided, the height of a tree increases by the value of 1.

To be specific, a non-leaf page (NewPage) is allocated at step 1301, and the entries of the current root page (CurrentPage) and of a CurrentPage's super page (CurrentPage.NextSuper) are binarized by using the split dimension (SplitDim) and split value (SplitValue) memorized at the first bisection at step 1302. The CurrentPage-Length which is the total size of data smaller than the SplitValue (pivot value), NewPageLength which is the total size of data having the same or larger values as or than the pivot value and a minimum size to fill a page (MinFillLength) are calculated, wherein the MinFillLength is (PageSize*MinFillPercent) at step 1303.

It is checked out whether the CurrentPageLength is larger than the MinFillLength or the NewPageLength is larger than the MinFillLength at step 1304. If the CurrentPageLength or the NewPageLength is larger than the MinFillLength, the entries of the CurrentPage and of the CurrentPage.NextSuper are split by the pivot value and stored in the NewPage and the CurrentPage.NextSuper individually at step 1306. The MBRs of the NewPage and the CurrentPage.NextSuper are written on the CurrentPage at step 1307. Then the loop of the SplitRootPage( ) function is terminated.

According to the determination of the step 1304, when the CurrentPageLength or the NewPageLength is not larger than the MinFillLength, the SplitValue and the SplitDim which satisfies the MinFill and also does not accompany the overlapping are selected, and then the above-described steps of 1306 and 1307 are processed.

FIG. 15 is a flow chart of a SplitInternalPage( ) function which deals with the overflow of the non-leaf page (index node) by performing the split. The SplitInternalPage( ) function is called by the ConstructIndexPage( ) function as illustrated in FIG. 12.

As illustrated in FIG. 15, the SplitInternalPage( ) function attempts a split by using the split dimension (SplitDim) and split value (SplitValue) and deals with an overflow of the non-leaf page by expanding the page into a super page when there is no overlap-free split.

The entries of the non-leaf page (CurrentPage) and the super page of CurrentPage (CurrentPage.NextSuper) are binarized by adopting the SplitDim and SplitValue memorized at the time of first bisection at step 1401. The CurrentPageLength which is the total size of data smaller than the SplitValue, the NewPageLength which is the total size of data having the same or larger values as or than the pivot value and the MinFillLength which is a minimum size to fill a page are computed at step 1402. It is determined whether the CurrentPageLength or the NewPageLength are larger than the MinFillLength at step 1403. When the CurrentPage-Length is found to be larger than the MinFillLength or the NewPageLength is figured out to be larger than the MinFillLength, the entries are divided to be stored in the CurrentPage and the CurrentPage.NextSuper at step 1404. The MBR entries for the CurrentPage and the CurrentPage.NextSuper are recorded on a parent page (ParentPage) at step 1405. Then the loop of the SplitInternalPage( ) function is completed.

In the step 1403, when it is not found true that the CurrentPageLength is larger than the MinFillLength, or the NewPageLength is larger than the MinFillLength, an expansion of the CurrentPage into a super page is carried out and the MBR entry thereof is recorded on the ParentPage at step 1406. Then the loop of the SplitInternalPage( ) function is finished.

Figure 16A:
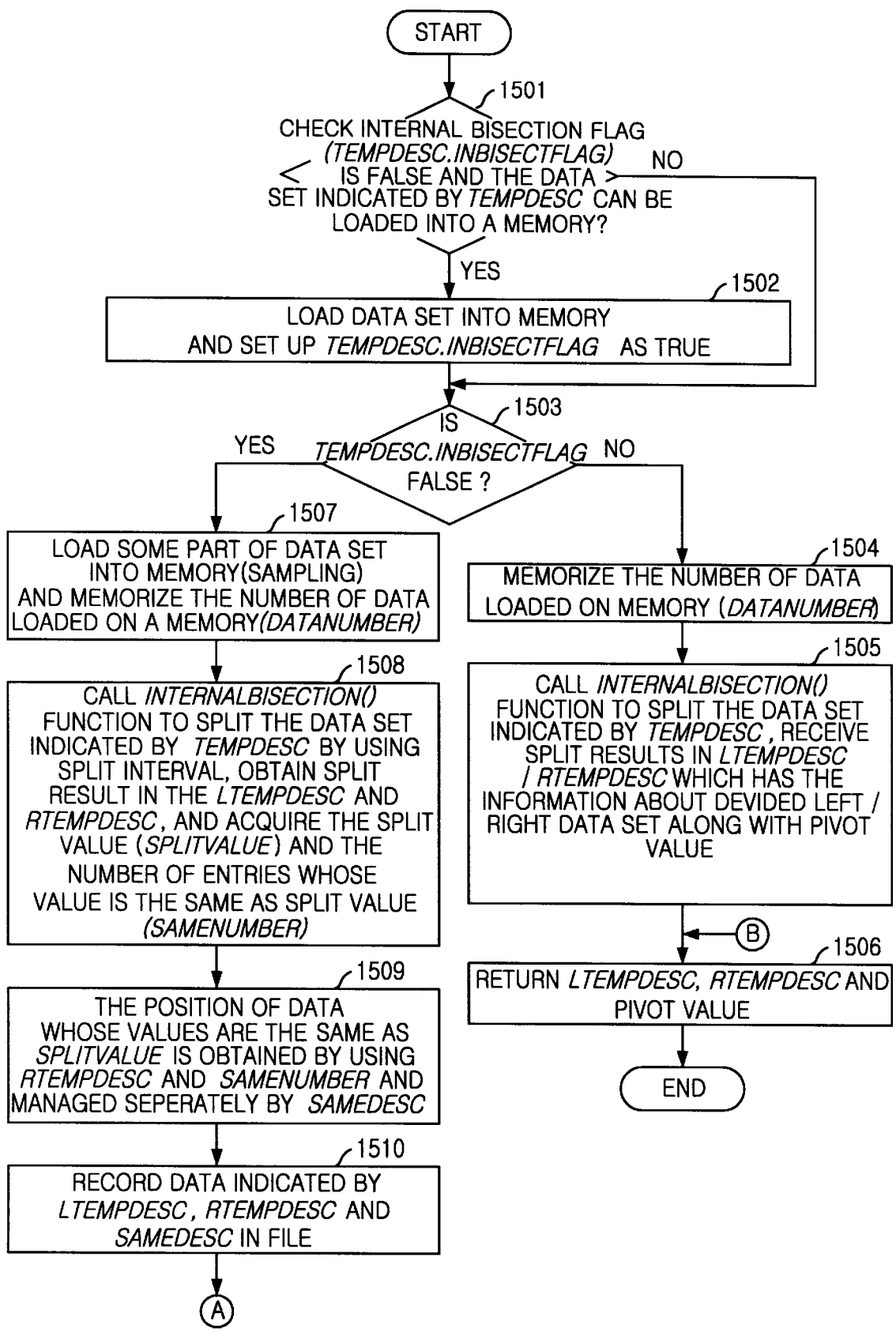
FIG. 16 provides a flow chart of a Bisection( ) function, called in the SubDataPartition( ) function, for binarizing the data set according to a split strategy.
Figure 16B:
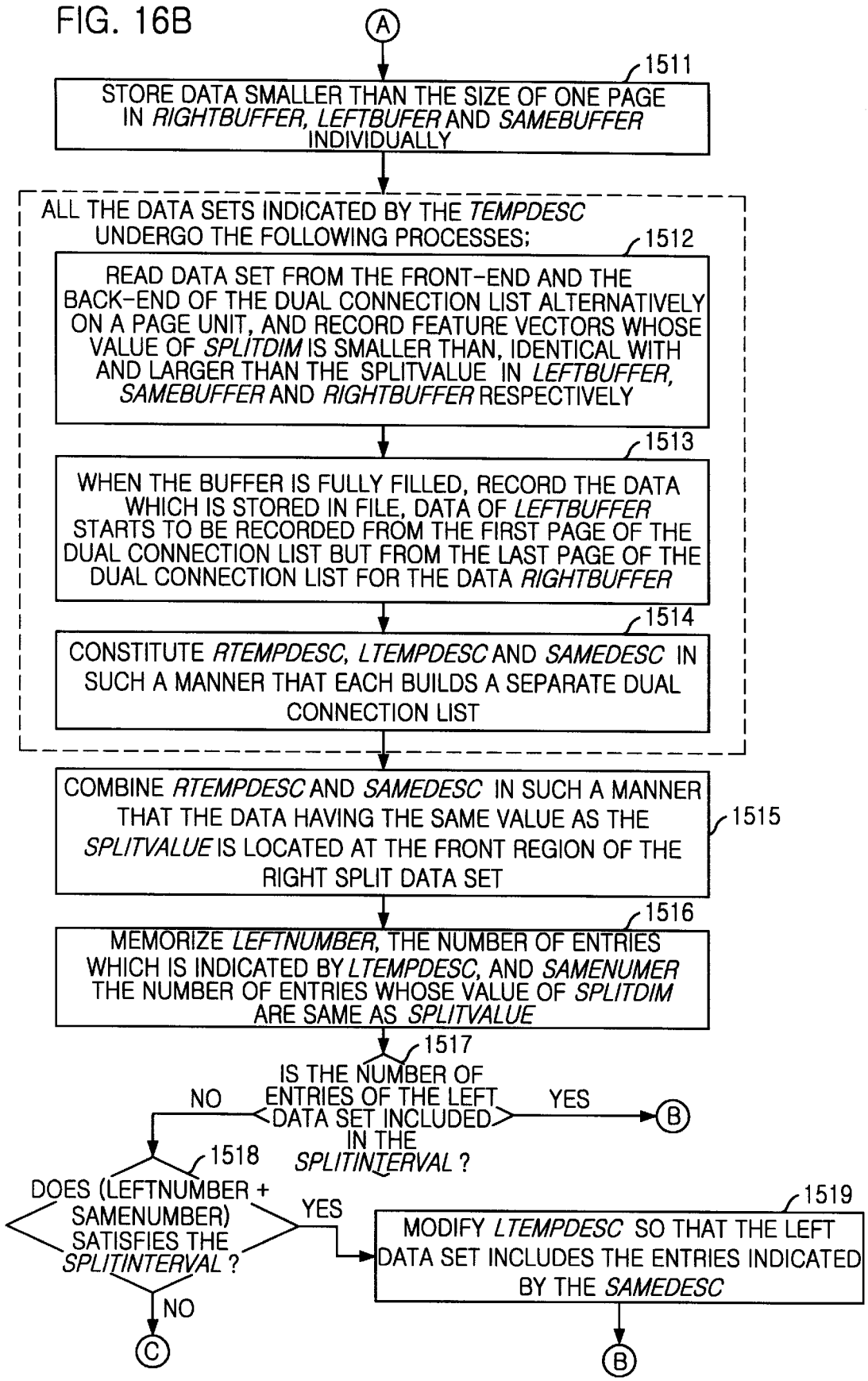
Figure 16C:
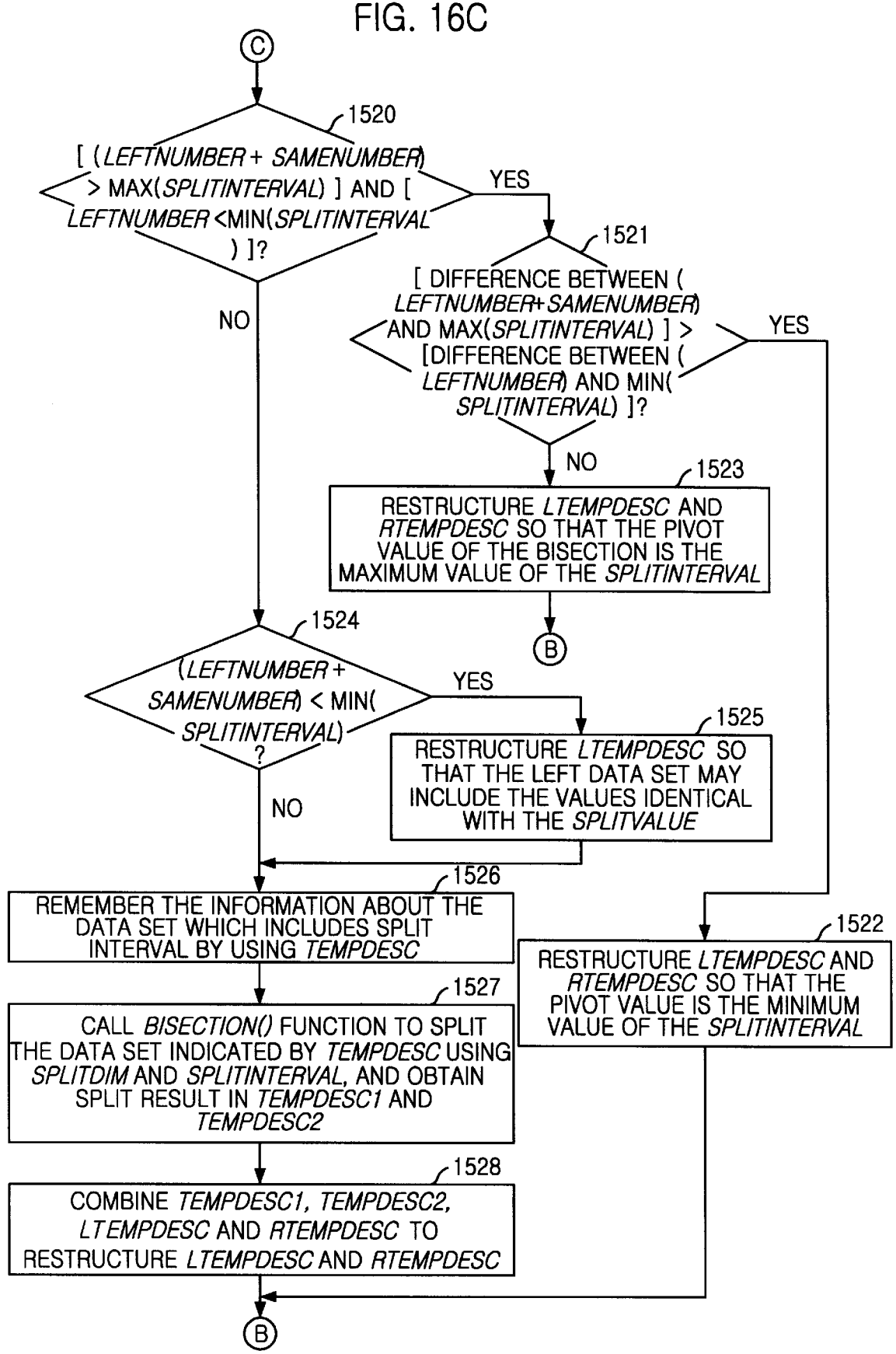

FIGS. 16A to 16C depict flow charts of a Bisection( ) function for binarizing the given data set according to the split strategy. The Bisection( ) function is called from the SubDataPartition( ) function as described in FIG. 13.

As shown in FIGS. 16A to 16C, the Bisection( ) function binarizes, according to the split dimension (SplitDim) and split interval (SplitInterval), the data set stored in a file indicated by the TempDesc; stores the bisection information in the RTempDesc and LTempDesc; and return the information along with the split value (pivot value).

Determinations are made about whether an internal bisection flag (TempDesc.InBisectFlag) is false and at the same time the data set indicated by TempDesc can be loaded into a memory at step 1501. When the TempDesc.InBisectFlag is false and at the same time the load of the data set indicated by TempDesc is possible, the data from the temporary file is loaded into the memory space for performing the internal bisection (TempDesc.InBisectSpace) and then the TempDesc.InBisectFlag is set up as true at step 1502 before proceeding to the step 1503.

On the other hand, when the judgment of step 1501 is false, determination is made about the falsity of the TempDesc.InBisectFlag at step 1503. When the TempDesc.InBisectFlag is not false, the number of data loaded on a memory (DataNumber) is memorized at step 1504. Then, an InternalBisection( ) function is called to split the data set indicated by the TempDesc by using the split range, and the split results are received in a left temporary file descriptor (LTempDesc) which contains the information about the splitted left sub-data set and a right temporary file descriptor (RTempDesc) which contains the information about the splitted right sub-data set along with the pivot value at step 1505. Then the LTempDesc, the RTempDesc and the pivot value are returned and the loop of the Bisection( ) function is terminated at step 1506.

Figure 17A:
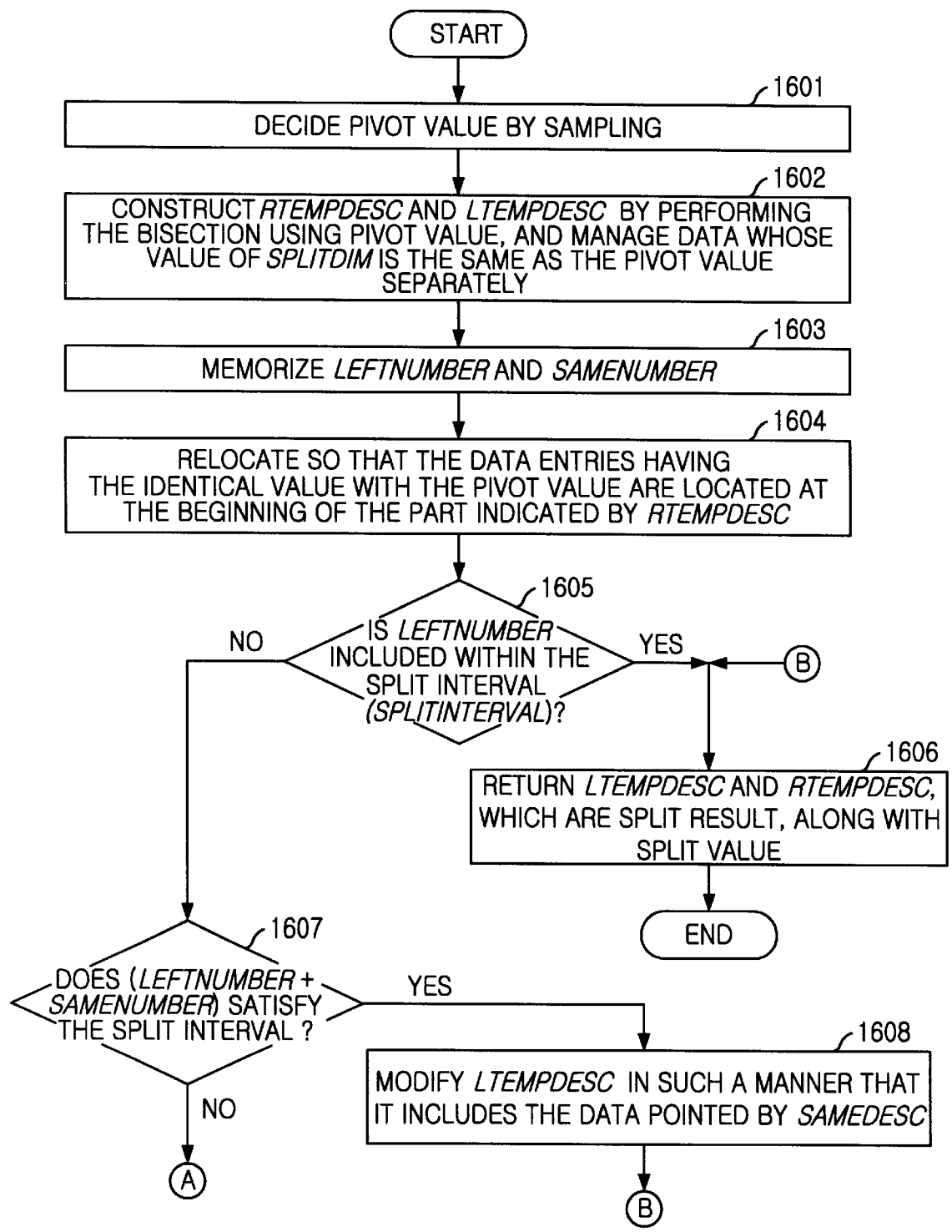
FIG. 17 presents a flow chart of an InternalBisection( ) function, called in the Bisection( ) function, for binarizing the memory-loaded data set according to a pivot value.
Figure 17B:
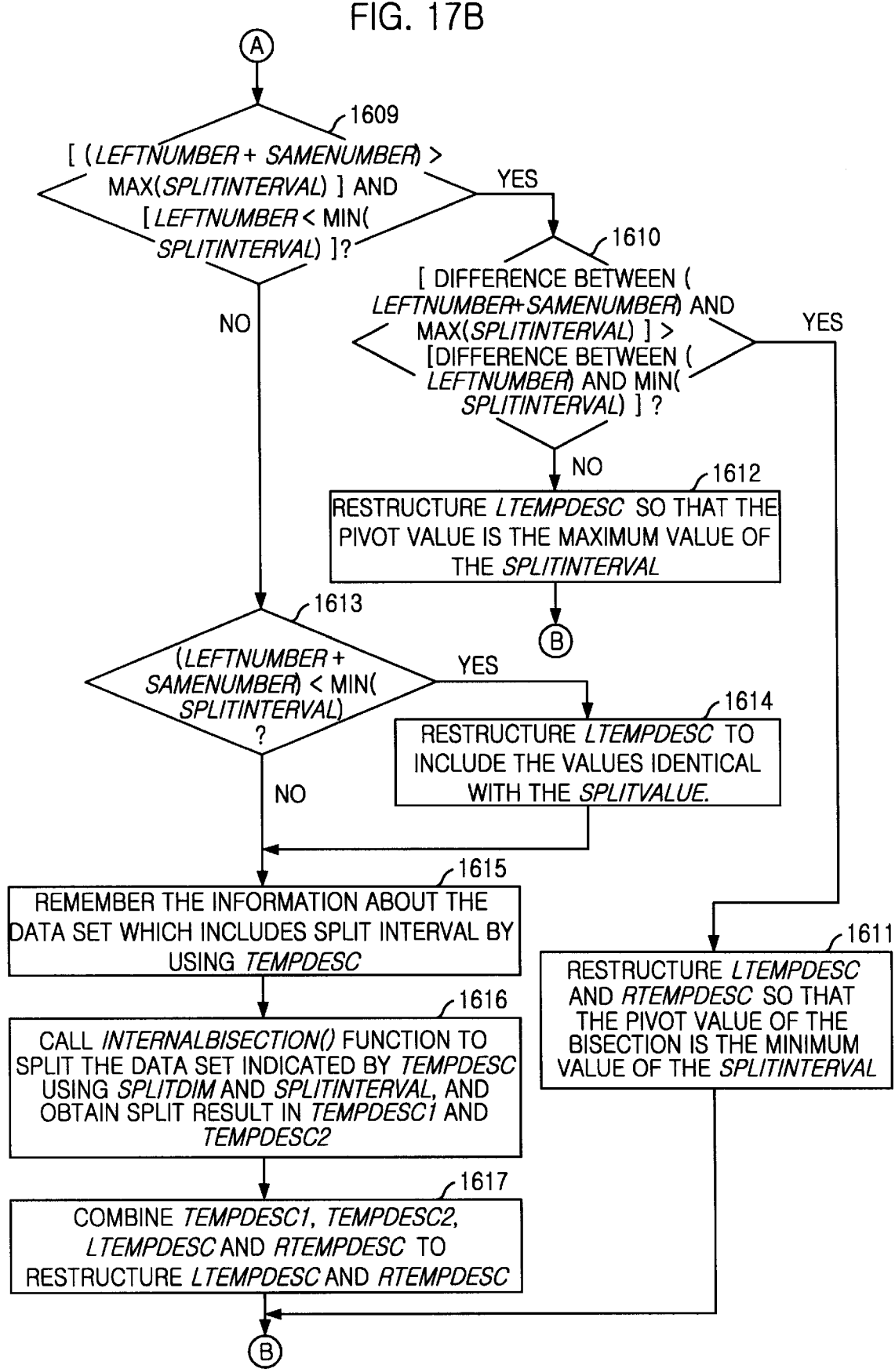

Referring to the step 1503 again, in case the TempDesc.InBisecFlag is found to be false, some part of the temporary file is sampled and loaded into the TempDesc.InBisectSpace, wherein the DataNumber is remembered at step 1507. Afterwards, an InternalBisection( ) function of FIG. 17 is called in order to split the data set indicated by the TempDesc by using the split interval, and the result of split is obtained in the LTempDesc and the RTempDesc. The split value (pivot value:SplitValue) and the number of data having values identical with the SplitValue (SameNumber) are also acquired at step 1508. Then, the position of the data whose values are the same as the SplitValue is obtained by using the RTempDesc and the SameNumber and managed separately by the temporary file descriptor (SameDesc) which contains the information about the identical data at step 1509. The data indicated by the LTempDesc, RTempDesc and SameDesc are recorded, wherein the recording unit is page size at step 1510.

Afterwards, the remaining data after written per page are stored in a right buffer (RightBuffer), a left buffer (LeftBuffer) and a same buffer (SameBuffer) individually at step 1511.

All the data sets indicated by the TempDesc is read from the front and the back of the dual connection list alternately on a page unit, wherein feature vectors smaller than the SplitValue, identical with the SplitValue and larger than the SplitValue are recorded in the LeftBuffer, SameBuffer and RightBuffer, respectively at step 1512. In the above-mentioned process, when the buffer is fully filled, the data which was stored are recorded in files, wherein the data of the LeftBuffer starts to be recorded from the first page of the dual connection list but from the last page of the dual connection list for the data of RightBuffer at step 1513. Then the RTempDesc, the LTempDesc and the SameDesc are constituted in such a manner that each builds a separate dual connection list at step 1514.

The RTempDesc and SameDesc are combined in such a manner that the data having the same value as the SplitValue (pivot value) is located at the front region of the right split data set at step 1515. Then, the number of data having smaller value than the pivot value (LeftNumber) and the number of data having the same value as the pivot value (SameNumber) are memorized at step 1516. Afterwards judgment is made about whether the number of entry of a left data set is included in the SplitInterval at step 1517.

When the LeftNumber is within the SplitInterval, the SplitValue, LTempDesc and the RTempDesc that are the split result are returned and the process is terminated at step 1506.

When the LeftNumber is not included in the SplitInterval, it is checked whether the number of entries which are identical with or equal to SplitValue, i.e., (LeftNumber+SameNumber), satisfies the SplitInterval at step 1518. If the (LeftNumber+SameNumber) is within the SplitInterval, the LTempDesc is modified so that the left data set includes the entries indicated by the SameDesc at step 1519. Afterwards, the step 1506 is performed and the process is completed.

When it is found, as a result of the checking in the step 1518, that the (LeftNumber+SameNumber) does not satisfy the SplitInterval, it is determined whether the (LeftNumber+samenumber) is larger than the maximum of the SplitInterval and also about whether the LeftNumber is smaller than the minimum of the SplitInterval at step 1520. In other words, it is determined whether the case is the same as 6E in FIG. 6, or not.

In case the (LeftNumber+SameNumber) is larger than the maximum of the SplitInterval and at the same time the LeftNumber is smaller than the minimum of the SplitInterval, it is determined whether the difference between the (LeftNumber+SameNumber) and the maximum of the SplitInterval is larger than the difference between the LeftNumber and the minimum of the SplitInterval at step 1521.

When the step 1521 reveals that the difference between the (LeftNumber+SameNumber) and the maximum of the SplitInterval is larger than the difference between the LeftNumber and the minimum of the SplitInterval, the LTempDesc and the RTempDesc are restructured so that the pivot value is the minimum value of the SplitInterval at step 1522. Then the step 1506 is carried out and the process is terminated.

When it is not found, in the step 1521, that the difference between the (LeftNumber+SameNumber) and the maximum of the SplitInterval is larger than the difference between the LeftNumber and the minimum of the SplitInterval, the LTempDesc and the RTempDesc is restructured so that the pivot value of the bisection is the maximum value of the SplitInterval at step 1523. Then the step 1506 is performed, and the process is completed.

Back to the step 1520, when it is not satisfied that the (LeftNumber+SameNumber) is larger than the maximum of the SplitInterval and the LeftNumber is smaller than the minimum of the SplitInterval, it is judged out whether the (LeftNumber+SameNumber) is smaller than the minimum value of the SplitInterval at step 1524.

When the (LeftNumber+SameNumber) is smaller than the minimum value of the SplitInterval, the LTempDesc is restructured so that the left data set may include the values identical with the SplitValue at step 1525.

The data set which includes the split interval is remembered by using the TempDesc at step 1526. Then, the Bisection( ) function is called to split the data set indicated by the TempDesc using the SplitDim and the SplitInterval, and the result of the split is obtained in the first temporary file descriptor(TempDesc1) and the second temporary file descriptor (TmepDesc2) at step 1527.

To be specific, if the LeftNumber is smaller than the minimum value of the SplitInterval, the Bisection( ) function is recursively called to perform the split of the data set nominated by the RTempDesc, whereas when the LeftNumber is larger than the maximum value of the SplitInterval, the Bisection( ) function is recurslvely called so as to split the data set which the LTempDesc indicates. The TempDesc1, TempDesc2, LTempDesc and RTempDesc, which are the results of the step 1527, are combined to restructure the LTempDesc and the RTempDesc, wherein the LTempDesc/RTempDesc is used to store the split result at step 1528. Then the step 1506 is carried out and the process is terminated.

FIG. 17 shows a flow chart of an InternalBisection( ) function called from the Bisection( ) function as illustrated in FIG. 16 in order to binarize a memory-loaded data set by the pivot value.

As described in FIG. 17, the InternalBisection( ) function binarizes the data set stored in the temporary file descriptor (TempDesc) by using a modified quick algorithm, and returns the pivot value and the two generated subdata sets to the RTempDesc and LTempDesc.

The InternalBisection( ) function detects a sample; decides the SplitValue (pivot value) at step 1601; and performs the bisection using the pivot value in order to construct the RTempDesc and LTempDesc, wherein the data whose value is the same as the SplitValue is managed separately at step 1602. The number of the data smaller than the SplitValue, hereafter referred to as LeftNumber and the number of the data identical with the pivot value, hereafter referred to as SameNumber are memorized at step 1603.

Relocation is carried out by the InternalBisection( ) function so that the values having the identical value with the pivot value are located at the beginning of the part indicated by the RTempDesc at step 1604. Then it is checked out whether the LeftNumber is included within the split interval (SplitInterval) or not at step 1605. When the LeftNumber is found to be included in the SplitInterval, the LTempDesc and RTempDesc, which are the split results, are returned along with the SplitValue at step 1606. Then the process is terminated.

When the LeftNumber is not included in the SplitInterval, however, it is examined whether the (LeftNumber+SameNumber) satisfies the SplitInterval at step 1607.

When the (LeftNumber+SameNumber) satisfies the SplitInterval, the LTempDesc is modified in such a manner that the data pointed by the SameDesc becomes included in the left data set at step 1608. Then the step 1606 is performed and the process of the InternalBisection( ) function is completed.

When, on the other hand, it is judged that the (LeftNumber+SameNumber) does not meets the SplitInterval, it is determined whether the (LeftNumber+SameNumber) is larger than the maximum value of the SplitInterval and the LeftNumber is smaller than the minimum value of the SplitInterval at step 1609.

When the questioned proposition of the step 1609 is found to be true, it is figured out whether the difference between the (LeftNumber+SameNumber) and the maximum value of the SplitInterval is larger than the difference between the LeftNumber and the minimum value of the SplitInterval at step 1610.

When it is found that the difference between the (LeftNumber+SameNumber) and the maximum value of the SplitInterval is larger than the difference between the LeftNumber and the minimum value of the SplitInterval, the LTempDesc and the RTempDesc are restructured so that the pivot value of the bisection may be the minimum value of the SplitInterval at step 1611. Then the step 1606 is performed and the process of the InternalBisection( ) function is terminated.

As a result of the step 1610, when it is found that the difference between the (LeftNumber+SameNumber) and the maximum value of the SplitInterval is not larger than the difference between the LeftNumber and the minimum value of the SplitInterval, the LTempDesc and the RTempDesc is restructured so that the pivot value of the bisection is the maximum value of the SplitInterval at step 1612.

Back to the step 1609, when it is not satisfied that the (LeftNumber+SameNumber) is larger than the maximum of the SplitInterval and at the same time the LeftNumber is smaller than the minimum of the SplitInterval, it is determined whether the (LeftNumber+SameNumber) is smaller than the minimum value of the SplitInterval at step 1613.

When the (LeftNumber+SameNumber) is found to be smaller than the minimum value of the SplitInterval, the LTempDesc is reconstituted to include the values identical with the pivot value at step 1614.

The information about the data which includes the SplitInterval is memorized by using the TempDesc (step 1615). Afterwards the InternalBisection( ) function is called to binarize the data set appointed by the TempDesc using the SplitDim and the SplitInterval, and the split result is received in the TempDesc1 and the TempDesc2 (step 1616).

To be specific, when the LeftNumber is smaller than the minimum value of the SplitInterval, the InternalBisection( ) function is recursively called to binarize the data set indicated by the RTempDesc so that the bisection satisfies the SplitInterval. However, when the LeftNumber is larger than the maximum value of the SplitInterval, the InternalBisection( ) function is recursively called to binarize the data set pointed by the LTempDesc so the bisection may satisfy the SplitInterval.

The RTempDesc and the LTempDesc, where the SplitInterval is stored, are restructured by combining the TempDesc1, TempDesc2, RTempDesc, and LTempDesc, wherein the TempDesc1 and TempDesc2 represents the split results of step 1616 (step 1617). Then the SplitValue and the SplitInterval are returned and the whole process of the InternalBisection( ) function is completed.

The method in accordance with the present invention can be realized as a program, and can be stored in a variety of computer readable recording medium, e.g., a CD-Rom, a Ram, a Rom, a floppy disc, a hard disc, optical magnetic disc, and the like.

The present invention provides a highly effective bulk loading method for high dimensional index structure. The method of the present invention uses a dimension partially, which makes it possible to shorten the time for an index construction. The bulk loading method of the present invention also increases the applicability of the space for storage, which in turn reduces the height of the index.

Further, the present invention constructs the index without the overlap between the nodes and reduces the height of a tree by calculating the topology of a tree in advance. Accordingly, the search performance can be considerable improved.

While the present invention has been described with respect to the particular embodiments, it will be apparent to those skilled in the art that various changes and modifications may be made without departing from the spirit and scope of the invention as defined in the following claims.

What is claimed is:

1. A bulk loading method employed in a high-dimensional index structure for constructing an index, which comprises the steps of:

(a) calculating a topology of the index by recognizing information for the index to be constituted with a given data set including a height and a fan-out of the index;

(b) splitting the given data set into sub-sets of data by repeatedly performing an establishment of a split strategy and a binarization based on the calculated topology of the index;

(c) if a leaf node is derived from the sub-sets of data divided through a top-down recursive split process, reflecting a minimum bounding region of the leaf node on a higher node; and (d) if a non-leaf node is generated, repeatedly performing the steps (a) to (c) for another sub-set of data to thereby produce a final root node, wherein the height h is determined by multiplying storage usability with maximum numbers of entries of the leaf node and an index node obtained from $$h = \left\lceil \log_{C_{eff,dir}}\left(\frac{n}{C_{eff,data}}\right) + 1 \right\rceil$$

wherein n represents the number of entries to be constructed;

$C_{eff,dir}$ is an average number of entries entered into the index node; and $C_{eff,data}$ is an average number of entries entered into the leaf node.

2. The bulk loading method as recited in claim 1, wherein the index structure is constructed by using some parts of dimensions.

3. The bulk loading method as recited in claim 1, wherein the fan-out is obtained as:

$$fanout(h, n) = \min\left(\left\lceil \frac{n}{C_{eff,data} \cdot C_{eff,dir}^{h-2}} \right\rceil, C_{max,dir}\right)$$

wherein h is the height of the index;

n provides the number of entries to be constructed;

$C_{eff,data}$ is an average number of entries entered into an index node;

$C_{eff,dir}$ is an average number of entries entered into the leaf node; and $C_{max,dir}$ represents a maximum number of entries entered into the index node.

4. The bulk loading method as recited in claim 1, wherein the height and the fan-out of the index are computed by determining a maximum number of entries enterable into the leaf node and that enterable into an index node.

5. The bulk loading method as recited in claim 4, wherein the maximum number of entries enterable into the leaf node is obtained as:

$$C_{max,\,data} = \left\lfloor \frac{PageSize}{sizeof(DataObject)} \right\rfloor$$

wherein $C_{max,data}$ depicts the maximum number of entries enterable into the leaf node;

sizeof(DataObject) represents a size of DataObject and is a sum of a feature vector and a size of RID(Record IDentifier) capable of recognizing a record in a data file; and PageSize shows a size of the leaf node or the index node storing the data.

6. The bulk loading method as recited in claim 4, wherein the maximum number of entries enterable into the index node is calculated as:

$$C_{max,\,dir} = \left\lfloor \frac{PageSize}{sizeof(int) \times (Ndim,\,act \times 2 + Ndim,\,inact) + sizeof(PageID)} \right\rfloor$$

wherein $C_{max,dir}$ is the maximum number of entries enterable into the index node;

PageID is a page identifier representing a lower page;

$N_{dim,act}$ represents the number of active dimensions; and $N_{dim,inact}$ depicts the number of inactive dimensions.

7. The bulk loading method as recited in claim 3, wherein the height and the fan-out are obtained by preventing an unnecessary increase of a height through the use of a value resulted from multiplying the storage usability with the maximum number of entries enterable into the leaf node and that enterable into the index node.

8. The bulk loading method as recited in claim 6, wherein the step (a) includes the steps of:

(a1) calculating the topology of the index structure by considering active dimensions and inactive dimensions contained in the data act; and (a2) computing an overflow of the index node caused by the calculation of the topology of the index structure through a node split and an extension to a super node.

9. The bulk loading method as recited in claim 6, wherein the subsets of data are split in a top-down fashion as many as the fan-out.

10. The bulk loading method as recited in claim 6, wherein the subsets of data are split in a top-down fashion by selecting a dimension whose length is largest among active dimensions as a split dimension and using information for a split position determined according to information for the selected split dimension and a split ratio.

11. The bulk loading method as recited in claim 6, wherein the binarization process employs a differential split ratio so as to resolve an overflow that may be caused when reflecting regional information of a node generated from the termination of the binarization on a higher level.

12. The bulk loading method as recited in claim 11, wherein the binarization which satisfies a minimum limit value to fill a page is performed at the beginning of the application of the differential split ratio, and at the stages thereafter an unbalanced binarization is performed.

13. The bulk loading method as recited in claim 6, wherein the binarization process selects a split interval by considering a minimum number of data that a sub-tree can have so as to reduce a total time required for the binarization.

14. The bulk loading method as recited in claim 6, wherein the binarization process includes an external and internal bisect on.

15. The bulk loading method as recited in claim 14, wherein the internal bisection process is utilized when a data set to be bisectioned is loaded into a memory, and a pivot value is determined by sampling some data.

16. The bulk loading method as recited in claim 14, wherein, in the binarization process, the data whose values are identical with the pivot value are sustained separately so that the bisection can be performed in the split interval.

17. The bulk loading method as recited in claim 14, wherein, in the binarization process, a left data set is set up as including the data whose values are identical with the pivot value when positions of the data are within the split interval, and then the binarization process is terminated.

18. The bulk loading method as recited in claim 14, wherein, in the binarization process, if the positions of the data having the identical values with the pivot value exceeds a maximum limit of the split interval, the data whose values are identical with the pivot value are classified into a right data set and the recursive binarization is performed for a left data set.

19. The bulk loading method as recited in claim 14, wherein, in the binarization process, if the positions of the data having the same values as the pivot value are below a minimum limit of the split interval, the data whose values are identical with the pivot value are classified into a left data set and the recursive binarization is performed for a right data set.

20. The bulk loading method as recited in claim 14, wherein, in the binarization process, if the positions of the data having the same values as the pivot value include the split interval, all the data whose values are identical with the pivot value are moved to either a left data set or a right data set whichever makes the binarization thereof closer to the split interval arid then the binarization process is terminated.

21. A computer program product for use in an indexing unit including a process, comprising:

a computer readable medium;

first program instruction means for calculating a topology of the index by recognizing information for the index to be constituted with a given data set including a height and a fan-nut of the index;

second program instruction means for splitting the given data set into subsets of data by repeatedly performing an establishment of a split strategy and a binarization based on the calculated topology of the index;

third program instruction means for, if a leaf node is derived from the subsets of data divided through a top-down recursive split process, reflecting a minimum bounding region of the leaf node on a higher node; and fourth program instruction means for, if a non-leaf node is generated, repeatedly executing the above processes performed by the first to third program instruction means for another sub-set of data to thereby produce a final root node, wherein the height h is determined by multiplying storage usability with maximum numbers of entries of the leaf node and an index node and decided as $$h = \left\lceil \log_{C_{\mathit{eff},dir}} \left( \frac{n}{C_{\mathit{eff},data}} \right) + 1 \right\rceil$$

wherein n represents the number of entries to be constructed $C_{\mathit{eff},dir}$ is an average number of entries entered into the index node; and $C_{\mathit{eff},data}$ shows an average number of entries entered into the leaf node.

* * * * *